United States Patent
Baker et al.

(10) Patent No.: US 12,323,468 B2
(45) Date of Patent: Jun. 3, 2025

(54) SECURE EXECUTION OF USER-DEFINED FUNCTIONS

(71) Applicant: Snowflake Inc., Bozeman, MT (US)

(72) Inventors: Brandon S. Baker, Redmond, WA (US); Derek Denny-Brown, Seattle, WA (US); Michael A. Halcrow, Kirkland, WA (US); Sven Tenzing Choden Konigsmark, Seattle, WA (US); Niranjan Kumar Sharma, Redmond, WA (US); Nitya Kumar Sharma, Bellevue, WA (US); Haowei Yu, Newark, CA (US); Andong Zhan, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/428,890

(22) Filed: Jan. 31, 2024

(65) Prior Publication Data
US 2024/0364744 A1    Oct. 31, 2024

Related U.S. Application Data

(63) Continuation of application No. 18/309,024, filed on Apr. 28, 2023, now Pat. No. 11,930,045.

(51) Int. Cl.
*H04L 9/40* (2022.01)
(52) U.S. Cl.
CPC .......... *H04L 63/20* (2013.01); *H04L 63/0245* (2013.01); *H04L 63/101* (2013.01)
(58) Field of Classification Search
CPC ... H04L 63/20; H04L 63/0245; H04L 63/101; H04L 63/0272; H04L 63/0281; G06F 21/53
(Continued)

(56) References Cited

U.S. PATENT DOCUMENTS

| 11,546,323 B1 * | 1/2023 | Jones | H04L 63/083 |
| 11,620,110 B1 * | 4/2023 | Du | G06F 9/543 |
| | | | 717/108 |

(Continued)

OTHER PUBLICATIONS

"European Application Serial No. 24172624.9, Extended European Search Report mailed Jun. 7, 2024", 9 pgs.
(Continued)

*Primary Examiner* — Kambiz Zand
*Assistant Examiner* — Aubrey H Wyszynski
(74) *Attorney, Agent, or Firm* — Schwegman Lundberg & Woessner, P.A.

(57) ABSTRACT

Systems and methods are disclosed for securely executing user-defined functions within a cloud data platform. A method involves receiving, via hardware processors, a request to execute a user-defined function (UDF) contained within a sandbox process. The UDF comprises code for performing specified operations that necessitate access to external resources. To facilitate this access, a secure egress path is established using an overlay network designed to isolate the UDF's network traffic from other processes. Authentication and authorization details for the UDF are managed externally to the sandbox process, ensuring that the UDF's functionality remains orthogonal to the cloud data platform's operations. This approach enables the secure and controlled execution of UDFs, allowing them to interact with external systems while maintaining the integrity and security of the cloud data platform environment.

30 Claims, 18 Drawing Sheets

(58) Field of Classification Search
USPC .......................................................... 726/11
See application file for complete search history.

(56) References Cited

U.S. PATENT DOCUMENTS

| | | | |
|---|---|---|---|
| 11,755,291 | B1 | 9/2023 | Du et al. |
| 11,930,045 | B1 | 3/2024 | Baker et al. |
| 12,050,890 | B2 | 7/2024 | Du et al. |
| 2004/0088333 | A1 | 5/2004 | Sidman |
| 2009/0254884 | A1 | 10/2009 | Rama et al. |
| 2012/0041752 | A1 | 2/2012 | Wang et al. |
| 2012/0191642 | A1 | 7/2012 | George |
| 2012/0191690 | A1 | 7/2012 | George |
| 2012/0239612 | A1 | 9/2012 | George et al. |
| 2013/0205287 | A1 | 8/2013 | Aslot et al. |
| 2015/0309980 | A1 | 10/2015 | Glass et al. |
| 2017/0099188 | A1* | 4/2017 | Chang ................. H04L 12/4633 |
| 2018/0101583 | A1 | 4/2018 | Li et al. |
| 2021/0406311 | A1* | 12/2021 | Brossard ............. G06F 16/2282 |
| 2022/0391492 | A1 | 12/2022 | Baker et al. |
| 2023/0066013 | A1 | 3/2023 | Ball |
| 2023/0393816 | A1 | 12/2023 | Du et al. |
| 2024/0143572 | A1* | 5/2024 | Ayyannan ............. H04L 67/535 |

OTHER PUBLICATIONS

"U.S. Appl. No. 18/362,114, Notice of Allowance mailed Apr. 26, 2024", 17 pages.

"U.S. Appl. No. 17/834,668, Non Final Office Action mailed Sep. 9, 2022", 14 pgs.

"U.S. Appl. No. 17/834,668, Response filed Dec. 9, 2022 to Non Final Office Action mailed Sep. 9, 2022", 11 pgs.

"U.S. Appl. No. 17/834,668, Notice of Allowance mailed Jan. 17, 2023", 18 pgs.

"U.S. Appl. No. 18/104,020, Notice of Allowance mailed May 10, 2023", 19 pgs.

"U.S. Appl. No. 18/309,024, Non Final Office Action mailed Jul. 19, 2023", 11 pgs.

"U.S. Appl. No. 18/104,020, Corrected Notice of Allowability mailed Aug. 10, 2023", 2 pgs.

"U.S. Appl. No. 18/309,024, Response filed Oct. 19, 2023 to Non Final Office Action mailed Jul. 19, 2023", 13 pgs.

"U.S. Appl. No. 18/309,024, Notice of Allowance mailed Nov. 8, 2023", 7 pgs.

U.S. Appl. No. 18/614,312, filed Mar. 22, 2024.

* cited by examiner

SECURE EXECUTION OF USER-DEFINED FUNCTIONS

CROSS-REFERENCE TO RELATED APPLICATION

This application is a Continuation of U.S. patent application Ser. No. 18/309,024, filed on Apr. 28, 2023, which claims the benefit of priority thereto, the contents of which are incorporated herein by reference in their entirety.

TECHNICAL FIELD

The subject matter disclosed herein generally relates to methods, systems, machine storage mediums, and computer programs for providing secure access for sandboxed user-defined functions.

BACKGROUND

Network-based database systems may be provided through a cloud data platform, which allows organizations, customers, and users to store, manage, and retrieve data from the cloud. With respect to this type of data processing, a cloud data platform could implement online transactional processing, online analytical processing, and/or another type of data processing. Moreover, a cloud data platform could be or include a relational database management system and/or one or more other types of database management systems.

Cloud-based data warehouses and other database systems sometimes provide support for custom user functions, such as a User-Defined Function (UDF) or stored procedures that enable such systems to perform operations that are not available through the built-in, system-defined functions. Existing techniques for the execution of UDFs, however, may lack robust security mechanisms for mitigating the associated security risks and ensuring that the user code is executed securely and with sufficient visibility for auditing.

BRIEF DESCRIPTION OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

DETAILED DESCRIPTION

Figure 1:
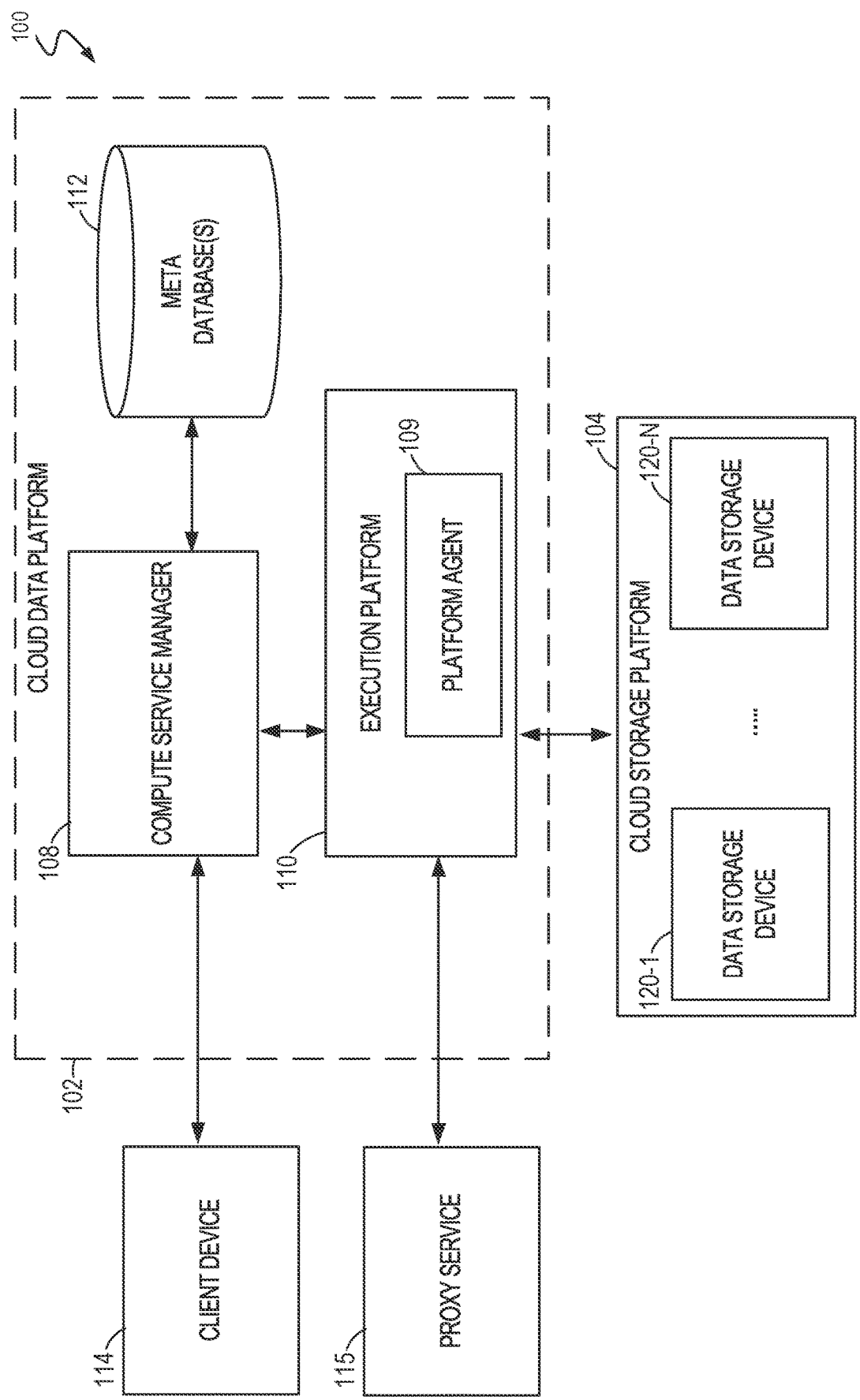
FIG. 1 illustrates an example computing environment that includes a cloud data platform in communication with a cloud storage provider system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

From the perspective of a user, external code can be made a seamless part of a cloud data platform functionality similar to any internally defined function or procedure. That is, the cloud data platform can access systems that are, by their nature, external to the cloud data platform (e.g., geocoding systems). Further, users are enabled to use any arbitrary external code regardless of the language used to author the code or the system on which the code executes. Moreover, the cloud data platform described herein allows users to invoke external functionality while avoiding security concerns that can arise from executing the code within the cloud data platform and do so in a manner that is orthogonal to the functionality of the cloud data platform. In addition, the technique for invoking external functionality from the cloud data platform externalizes security-sensitive authentication information as this information is handled by the cloud data platform.

Example embodiments of the present disclosure include a cloud data platform (e.g., a cloud-based data warehousing platform) that enables users to have direct access to the Internet from a User-Defined Function (UDx), where the UDx includes code that runs in a sandbox process or sandboxed environment. More specifically, example embodiments allow users to directly connect to external resources from sandboxed code. External access from the UDx is a critical requirement for users (e.g., customers) of the cloud data platform that cannot be met with previous technical solutions, such as external functions.

For purposes of this description, example embodiments can apply to a User-Defined Function (UDF), User-Defined Table Function (UDTF), User-Defined Aggregation Function (UDAF), external functions, Streamlit®, or other stored procedures used in relational databases for performing complex data processing tasks, enforcing business rules, and the like can be applied or employed according to the present disclosure. However, for simplicity, the detailed embodiments will describe examples of providing secure external access to the UDx executing within a sandbox environment directly to the Internet using familiar programming languages (e.g., Java, Scala, Python, etc.), but it will be understood that the same principles may be used for other types of database logic and programmatic constructs from a sandboxed environment or a non-sandboxed environment. For example, although example embodiments describe external access of user-defined functions in a sandboxed environment, similar logic can be applied to non-sandboxed environments, such as external access of user-defined functions in containerized environments, or other constructs of the cloud data platform.

In computer security, a sandbox (e.g., sandbox environment) is a security mechanism for separating running programs, usually to prevent system failures or prevent exploitation of software vulnerabilities. A sandbox can be used to execute untested or untrusted packages, programs, functions, or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDxs typically can run in a sandbox environment. Some example embodiments described herein can be run within a sandbox environment, which is described and depicted in more detail in connection with FIG. 4.

Traditional approaches for accessing the Internet required the use of external functions (described in more detail below); however, sandboxed UDFs have no way of accessing the Internet directly. Currently, user code running in a sandboxed environment or a sandbox process cannot make network calls. The sandbox does not have a network device, and the required system calls are blocked. However, simply enabling networking in the sandbox is not enough, as the cloud data platform must ensure that the traffic can only go to allowed destinations, does not impact other workloads, and is well-monitored. For example, currently for users who want their workloads in the cloud data platform to access external services must use the external function feature, which constrains the service to be something that must implement a Hypertext Transfer Protocol Secure (HTTPS) endpoint that is accessible from the cloud data platform and must accept JavaScript Object Notation (JSON) inputs and return JSON outputs representing batches of rows. While the external function feature is important, it requires that customers must take care in the way they use batches of rows with external functions. And, while customers can mitigate the JSON issue with a customer serializer/deserializer tied to JavaScript, such prior solutions are cumbersome. Thus, while prior solutions make it possible for customers to cobble together an end-to-end solution for many of their data access needs using the prior external function feature, it is unwieldy and less streamlined of an experience for the customer.

For example, external functions are a type of UDF, which call executable code that is developed, maintained, stored, and executed outside of the cloud data platform, where the remotely executed code is known as a remote service. Information sent to a remote service is usually relayed through a proxy service. Inside the cloud data platform, the external function is stored as a database object that contains information that the cloud data platform uses to call the remote service. This stored information can include a Uniform Resource Locator (URL) of the proxy service that relays information to and from the remote service (e.g., information specified as part of a CREATE EXTERNAL FUNCTION command). The remotely executed code is known as a remote service, which can act like a function (e.g., it must return a value). Examples of a remote service can be implemented as an AWS Lambda® function, a Microsoft Azure® function, an HTTPS server (e.g., Node.js) running on an EC2® instance, and the like. The cloud data platform calls a proxy service instead of a remote service directly, which relays the data to the remote device. The proxy service can increase security by authenticating requests to the remote service. The proxy service can also relay the response from the remote service back to the cloud data platform. Examples of a proxy service can include Amazon® Application Programming Interface (API) Gateway, Microsoft Azure® API Management service, and the like. Users can write and call their own remote services, or call remote services written by third parties. From the perspective of a user running a Structured Query Language (SQL) statement, an external function behaves like any other UDF.

According to prior existing solutions, external functions can be burdensome to implement. In order to develop an external function, developers typically had to write code to convert the batches into a format the ultimate service they are using can understand, where that code needed to live externally (e.g., in a Lambda function, or in a request translator in the cloud data platform). In either case, that translation logic ends up being separated from other logic (e.g., error handling, conditional business logic, etc.) that should belong together, making the end-to-end hard to maintain.

Prior existing solutions can have additional complications that make technological advancements necessary. For example, APIs can be non-standard, such that the code needed to produce or handle bathes of records in the cloud data platform's format can be substantial and can be unique to a cloud data platform implementation. According to some prior existing solutions, the cloud data platform currently exposes a batched scalar function interface, such that users wishing to implement a table function or stored procedure require additional interfaces to be supported. Further existing limitations can include limited interfaces only interacting via HTTP. In order to use protocols not mediated by HTTP (e.g., like those underlying most Java Database Connectivity (JDBC) connections), users must build and host an HTTP frontend outside of the cloud data platform.

Examples of the present disclosure overcome the current technological challenges by providing a generic and orthogonal solution that adds external access as an option to all sandboxed code in the cloud data platform. With external access as an orthogonal component, users are able to implement external variants of any contract the cloud data platform exposes, as it is exposed. Additional improvements enable users to write standard code. For example, users already know how to interact with remote services, and they do so by using standard libraries and policies (e.g. Python requests library, JDBC, etc.). Example embodiments enable users to incorporate or bring along these libraries without modification and enable users to use them with little to no changes in their code. Examples of the present disclosure overcome the current technological challenges by retaining security and providing control to the account administrators. For example, administrators on the machine must explicitly control the ability to reach out of the system to prevent unintentional data egress. Examples of the system strictly enforce these controls and provide an agent-based approach to reach data stored in private networks.

Example embodiments of the present disclosure overcome the technical challenges relating to Internet access by providing strict egress control and network isolation. The methods, systems, and computer programs described herein allow for direct UDx external access using the advantages of a secure egress path from the UDx running in a sandbox process to the Internet. According to some examples, systems, methods, and computer programs provide a mechanism to permit any sandboxed UDx code to reach out securely to the hosts explicitly allowed (e.g., via an allowlist) by an account administrator. Examples provide characteristics and requirements to allow administrators and developers to write standard code and use familiar libraries to perform external access for a wide variety of scenarios, while leaving the account administrators in control of data egress.

The new solution presented herein overcomes the prior existing technological challenge of accessing the Internet by providing a secure egress path from UDx executing in sandboxes to the Internet. This new solution allows a UDx to be written in standard code and use other third-party libraries overcoming the usability challenges associated with external functions. For example, the code for the remote service can be written in languages that other UDFs cannot be written in, the remote services can use functions and libraries that cannot be accessed by internal UDFs (e.g., remote services can interface with commercially available third-party libraries), developers can write remote services that can be called from both the cloud data platform and from other software written to use the same interface, and other such technological advantages.

According to some example embodiments, allowing external access from a UDx will unblock both external customers of the cloud data platform and internal users of the cloud data platform (e.g., native applications, Connectors, Streamlit®, etc.). For example, customers and users work with some data that may not always exist within the cloud data platform, such as metadata, reference data, or even low latency cache. Enabling direct external access according to examples presented herein provides a path for users to connect these databases via tools (e.g., JDBC, database Software Development Kits (SDKs)) in order to pull in that data during a larger query or data pipeline process. It will also be possible to write a code to interact with Kafka topics from inside the cloud data platform once Internet access is enabled.

In some example embodiments, architectural improvements (e.g., functional requirements and non-functional requirements) can include support for standard code and libraries, strict egress control, strict network isolation, performance, and/or additional improvements are provided. For example, by supporting standard code and libraries, customers are able to bring their code and libraries from local environments or other hosted environments without modifications, such as customizations or specialized APIs required by the cloud data platform. Therein overcoming one of the largest usability challenges from prior solutions such as external functions.

For example, by providing strict egress control, any egress traffic from sandboxes must go through one or more egress proxies, where any egress traffic can be allowed if it is authorized by the database administrator. Strict egress control can be guaranteed by the cloud data platform as violations will be blocked and reported. Strict network isolation is provided as any egress traffic from a sandbox is not allowed to access any other sandboxes or any other execution platform instances. In addition, the cloud data platform can manage performance, observability, and debuggability by providing efficient external access while ensuring the egress traffic is well-monitored, traced, and providing feedback to the cloud data platform and users.

Example embodiments include technical solutions over prior external function features by providing direct access to services that inherently live outside of the cloud data platform. Additional examples include enabling users to store their API key as a secret in the cloud data platform, configure an integration object that permits use of this API key and access to the remote API, and create a standard or relatively-standard Java or Python function that uses the stored credential to make the call using a standard API (e.g., a request).

According to some examples, users may desire to ingest data from third-party platforms (e.g., Software-as-a-Service (SaaS) data ingestion) that effectively function as databases and expose a web API. While this can be accomplished by existing scalar external functions, such prior methods are complicated and require additional steps. For example, using existing scalar external functions results in collections that are packaged and returned as variant objects that require being broken out in the calling SQL, thereby complicating the calling query, requiring multiple calls to be made, and/or requiring special handling for variable return types or error conditions. Example embodiments of the present disclosure overcome the technical challenges of prior methods by providing direct sandbox access including table function interfacing to be wrapped around standard methods for calling and retrieving batches from an external resource, thereby reducing the amount of one-off code needed to implement such functions.

Example embodiments further provide account administrators with additional functionalities to enhance security, privileges, and abilities. For example, administrators can specify where sandboxed functions can connect, such as basing these specifications on Domain Name System (DNS) names or wildcard-based DNS patterns. Administrators can grant and revoke use of these access usage rights to developers in a granular fashion and allow developers to apply granted access rights to specific functions that the developers author. Administrators can additionally selectively grant developers the ability to use secrets to connect to a remote system, and administrators can easily revoke access and prevent code from reaching out.

Example embodiments provide developer users with the ability to use authorization they have been granted by an admin to create a function that can open a Transmission Control Protocol (TCP) or HTTP connection to an authorized host. Developers can use standard APIs for making these TCP or HTTP connections without needing to rewrite a JDBC connector to make it work using the cloud data platform's TCP system. Further examples enable external access for any sandboxed code of any type, for example, UDF, UDTF, UDAF, User Datagram Protocol (UDP), etc. Additional example embodiments provide developer users with the ability to enable batched requests. For example, if a user wants to call a batched scalar function (e.g., the HERE geocoder), the user can write a batched UDx to do so.

Additional examples of the system disclosed herein prevent code from making any connection to a host not authorized by its specification and prevent a developer from authorizing any code to connect to a host they have not been granted rights to access. The system can prevent any user from seeing the contents of a secret unless this permission has been explicitly granted; for example, a caller of a function should not gain access to a secret simply because they can call the function. Examples of the system can further prevent code from making any DNS requests for hosts it is not authorized to connect to (e.g., exfiltration risk). The system can ensure external control for any network access, whereby such requests can route through the cloud data platform egress proxy and a compromised execution platform node should not be able to bypass such restrictions. Additional examples of the system disclosed herein can capture and report to the account administrator attempts to open a connection to or perform a DNS lookup that was blocked by permissions.

FIG. 1 illustrates an example computing environment 100 that includes a database system in the example form of a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the cloud data platform 102 in communication with a cloud storage platform 104 (e.g., AWS®, Microsoft Azure Blob Storage®, or Google® Cloud Storage). The cloud data platform 102 is a network-based system used for reporting and analysis of integrated data from one or more disparate sources including one or more storage locations within the cloud storage platform 104. The cloud data platform 102 can be a network-based data platform or network-based data system. The cloud storage platform 104 comprises a plurality of computing machines and provides on-demand computer system resources such as data storage and computing power to the cloud data platform 102.

The cloud data platform 102 comprises a compute service manager 108, an execution platform 110, a proxy service 115, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the cloud data platform 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N can be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (e.g., as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

The compute service manager 108, metadata database(s) 112, proxy service 115, and execution platform 110 are operatively connected to a platform agent 109, which provides for an agent in the execution platform 110 as a long running service to handle extended Berkeley Packet Filter (eBPF) related operations. The platform agent 109 can include a Remote Procedure Call (RPC) server via a Unix domain socket that can handle requests sent from execution platform worker processes. Sample requests can include load specific eBPF programs, read/write to BPF maps, configure network devices, and the like. The platform agent 109 can further handle external access BPF code and can be extended to capture more BPF uses cases, while receiving relevant cloud data platform information from any of the compute service manager 108, metadata database(s) 112, proxy service 115, execution platform 110, or alternative operatively connected modules from within the cloud data platform 102, or externally connected data sources. The platform agent 109 is depicted and described in combination with FIG. 6.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, platform agent 109, proxy service 115, and cloud storage platform 104 are shown in FIG. 1 as individual discrete components. However, each of the compute service manager 108, metadata database(s) 112, proxy service 115, execution platform 110, platform agent 109, and cloud storage platform 104 can be implemented as a distributed system (e.g., distributed across multiple systems/platforms at multiple geographic locations). Additionally, each of the compute service manager 108, metadata database(s) 112, execution platform 110, platform agent 109, proxy service 115, and cloud storage platform 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a suitable candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

The platform agent 109 is illustrated as a component of execution platform 110; however, additional example embodiments of the platform agent 109 can be implemented by any of the virtual warehouses of the execution platform 110, such as the execution node 302-1, compute service manager 108, the request processing service 208, the security manager 422, and/or external components of the cloud data platform 102 in accordance with some embodiments of the present disclosure.

Figure 2:
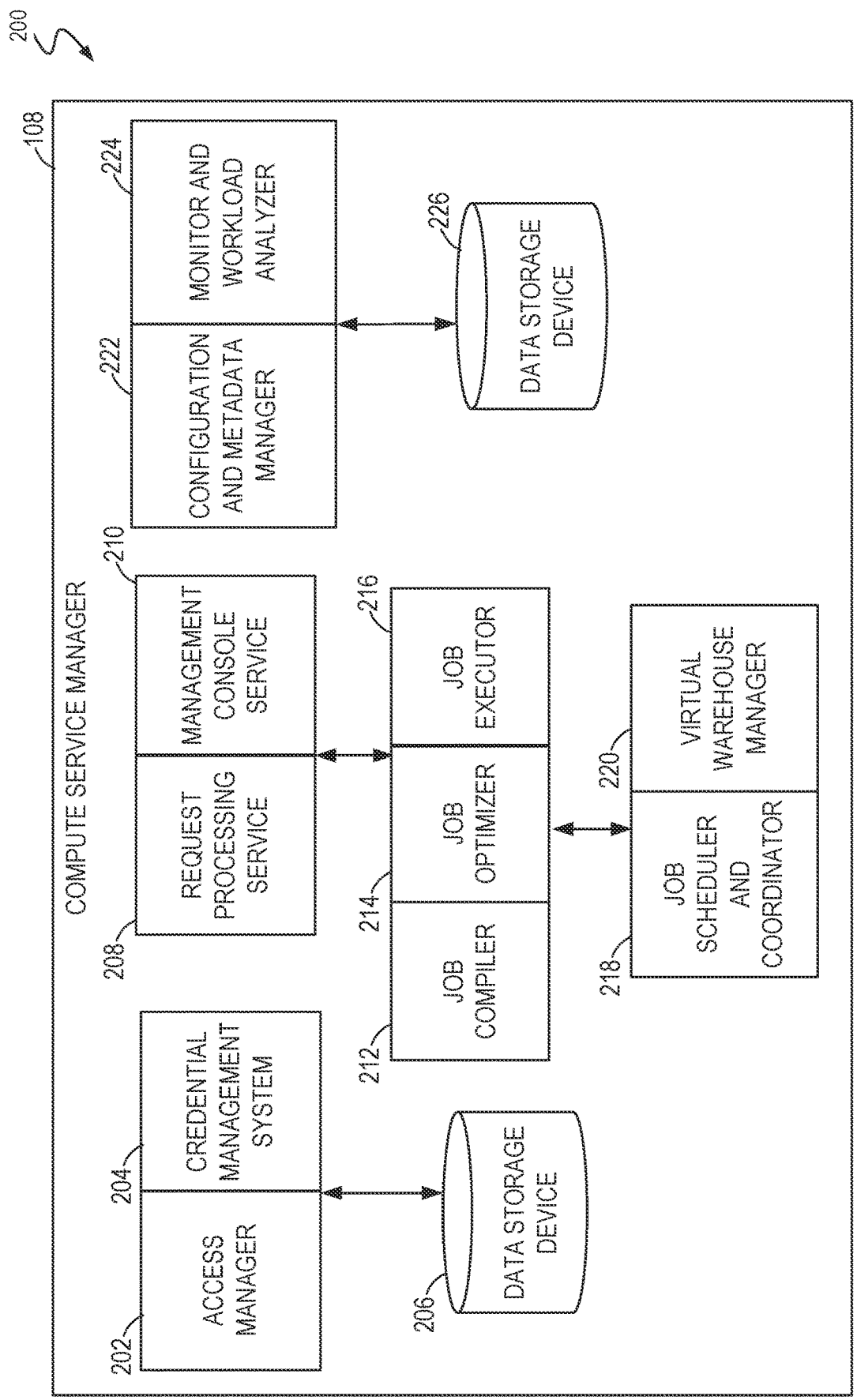
FIG. 2 is a block diagram illustrating components of a compute service manager, according to some example embodiments.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to access data storage device 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs can be prioritized and then processed in that prioritized order. In an embodiment, the job scheduler and coordinator 218 determines a priority for internal jobs that are scheduled by the compute service manager 108 with other "outside" jobs such as user queries that can be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
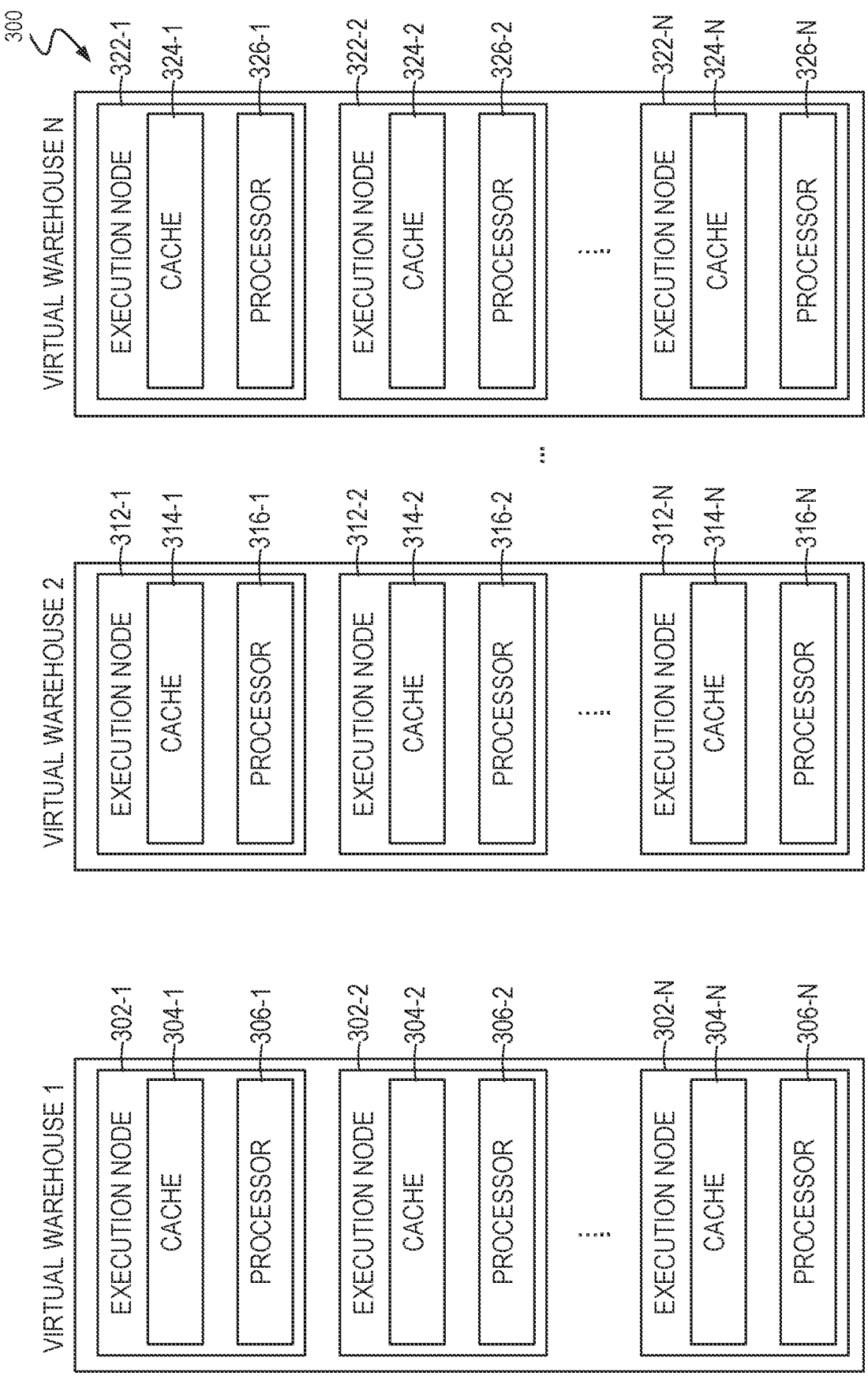
FIG. 3 is a block diagram illustrating components of an execution platform, according to some example embodiments.

FIG. 3 is a block diagram 300 illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
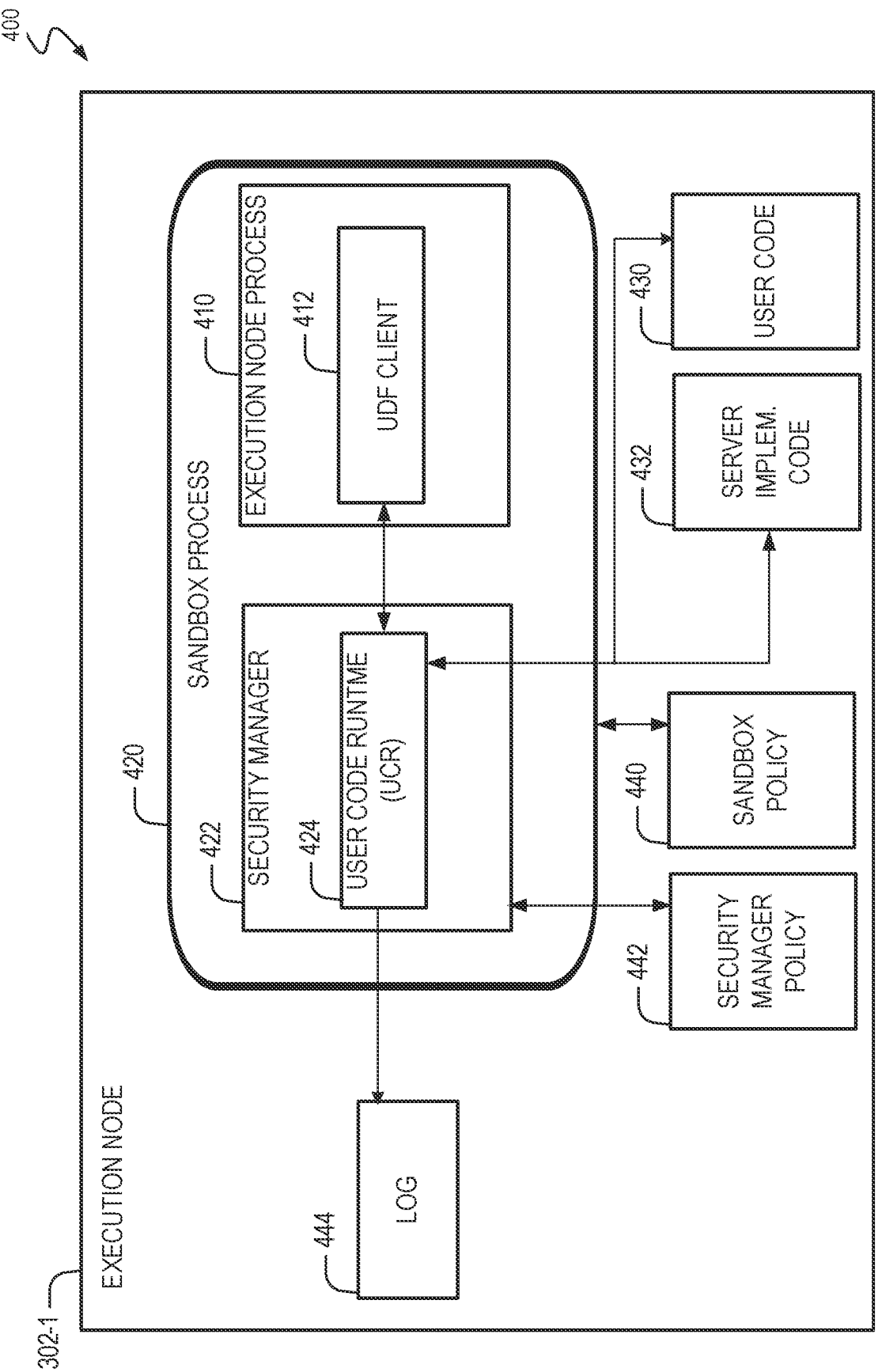
FIG. 4 is a computing environment conceptually illustrating an example software architecture executing a user-defined function (UDF) by a process running on a given execution node of the execution platform, according to some example embodiments.

FIG. 4 is a computing environment 400 conceptually illustrating an example software architecture executing a user-defined function (UDx) by a process running on a given execution node of the execution platform 110 of FIG. 3, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one with the same or fewer potential security exploits).

User code 430 may be provided as a package, e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA-based UDF) can be performed by a user code runtime 424 executing within a sandbox process 420. In an embodiment, the user code runtime 424 is implemented as a virtual machine, such as a JAVA virtual machine (JVM). Since the user code runtime 424 executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the cloud storage platform 104.

Examples of the log 444 can include logging for observability and debuggability. Logging can be automatically configured to observe egress traffic using a logging mechanism with runtime-configurable verbosity levels. For example, use of an event output log or event output helper can allow for passing custom structs from the eBPF program to a performance event ring buffer along with an optional packet sample. In response, the execution platform worker can pull the logs from log 444 or other logs from the buffer and write to execution platform logs, as an example. This channel can be used to log, debug, sample, and/or push notifications for network policy violations and the like. For example, the event output log or helper can be configured to pass the data through a lockless memory mapped per-CPU performance ring buffer, which is significantly faster (e.g., more efficient) than default logging support in eBPF.

Additional examples of the log 444 or other logs of the cloud data platform 102 can be used to provide clear and actionable feedback necessary for users if their UDF's packet has been blocked. With the logging mechanism, the cloud data platform 102 or component thereof can report details back to the user (e.g., which IP and port has been blocked or violated the account policy). Additionally, when an unauthorized DNS request has been blocked, the eBPF program can intercept the packet and report back which hostname it tried to access and enter such information into the log 444, which is valuable for helping customers to troubleshoot and debug their UDx.

Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Security manager 422, in an example, can prevent completion of an operation from a given UDF by throwing an exception (e.g., if the operation is not permitted), or returns (e.g., doing nothing) if the operation is permitted. In an implementation, the security manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

For example, the instance of a computer program can be instantiated by the execution platform 110. For example, the execution node 302-1 can be configured for instantiating a user code runtime to execute the code of the UDF and/or to create a runtime environment that allows the user's code to be executed. The user code runtime can include an access control process including an access control list, where the access control list includes authorized hosts and access usage rights or other types of allowlists and/or blocklists with access control information. Instantiating a sandbox process can determine whether the UDF is permitted and instantiating the user code runtime as a child process of the sandbox process, the sandbox process configured to execute the at least one operation in a sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, inter-process communication, and the like) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., an object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
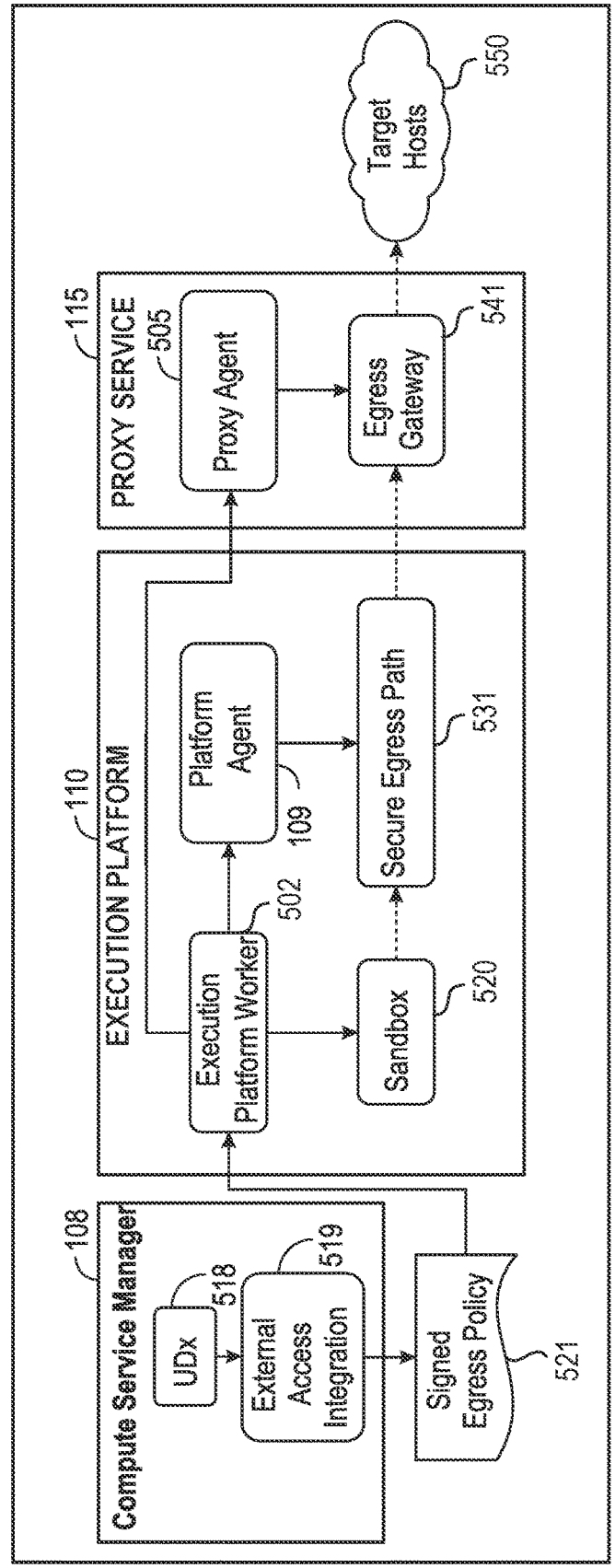
FIG. 5 is a block diagram illustrating a User-Defined Function (UDx) external access system architecture, according to some example embodiments.

FIG. 5 shows a block diagram illustrating an example embodiment of a User-Defined Function (UDx) external access system architecture 500, according to some example embodiments.

The system architecture 500 as described and depicted in connection with FIG. 5 shows a high-level diagram of the components involved in securing egress to target hosts (the egress path is described in more detail below). In the illustrated example, a key 501 provides for solid arrows denoting a control flow (e.g., control path) and dotted arrows denoting a data flow (e.g., data path) amongst and between corresponding components of the UDx external access architecture. Specifically, the example system architecture 500 illustrates a control flow and a data flow between a compute service manager 108, an execution platform 110, a proxy service 115, and target hosts 550.

Below is one example that defines a UDx that wants to access maps.googleapis.com (e.g., external access) for geocoding, where the SQL syntax is just one possible example of applicable code:

```
::::::CODE::::::
CREATE EXTERNAL ACCESS INTEGRATION GOOGLE_MAPS_APIS
EGRESS_RULES = ('maps.googleapis.com', 'maps.google.com');
CREATE FUNCTION GEOCODE(location varchar) . . .
EXTERNAL_ACCESS_INTEGRATIONS = ( GOOGLE_MAPS_APIS )
HANDLER = 'geocode'
AS
$$
import requests
def geocode(location):
    return requests.get
    ("https://maps.googleapis.com . . . ".format(location)).json( )
$$;
::::::CODE::::::
```

When the above example code (e.g., UDx) is used in a query, one or more of the following actions are performed.

The UDx 518 can be authorized to access maps.googleapis.com by the external access integration 519. The external access integration 519 can be an existing or a new type of integration object that is used to control a user's ability to reach out to a particular host or set of hosts (e.g., target hosts 550). For example, the external access integration 519 can be used to control the locations that can be connected to by sandboxed functions (e.g., UDx 518). In some example embodiments, once usage on the integration is granted to a user, how the user connects to a host or what they do on the host can be unconstrained. As with other integrations, they may only be creatable by the account administrator, who can then grant USAGE on the integration to grant privileges to other users (e.g., roles on the account). According to some examples, the integration can be used for access control; for example, users with USAGE on the integration can build functions that can access hosts that match the provided allowlist(s), and a function whose owner has USAGE on the integration is then permitted to access those hosts.

The function (e.g., UDx 518) can specify a concrete endpoint or set of endpoints to which the function is going to connect. Thereby providing the system with the specific host to open up for queries using the function. Once this is configured, the client can use standard networking calls provided that the target hosts 550 are configured. As the example illustrates, with an appropriate integration, a user could access any endpoint they wanted (assuming they have the appropriate credentials). In order to promote good practices for handling credentials, the cloud data platform 102 or component thereof can employ a secrets object (e.g., the account administrator can provision a new credential including a secret). A user with READ privileges on the secret credential could then use it to create a function. Unlike with USAGE on a secret, READ allows reading the contents of the secret from inside the UDFs.

Once the UDx 518 is authorized, the compute service manager 108 or a component thereof can generate an egress policy and sign the egress policy for this UDx (e.g., signed egress policy 521). Once signed, the compute service manager 108 can deliver the signed egress policy 521 or cause the egress policy to be delivered to the execution platform 110 with a query execution plan. The egress policy contains one or more lists of allowed IP addresses (e.g., for maps-.googleapis.com in this example case).

An execution platform worker 502, such as execution node 302-1, will do two things before the UDx starts. First, the execution platform worker 502 transmits the policy or causes the policy to be transmitted to an egress proxy, such as proxy agent 505. Second, the execution platform worker 502 initiates or sets up a secure egress path (described in more detail below) for the sandbox process where the UDx lives. Once the UDx 518 starts to run, the egress traffic from the UDx 518 will be strictly forwarded through the secure egress path to the proxy agent 505 (e.g., egress proxy) and eventually be allowed to pass through an egress gateway 541 to the target public hosts (e.g., target hosts 550).

According to some examples, the system architecture 500 further illustrates a secure egress path 531, which can be set up in different ways, such as by performing egress control on network Layers 3, 4, and/or 7 and/or establishing a secure egress path using an overlay network to achieve strict egress control and isolation.

In considering Layer 3 (L3) (e.g., network layer), Layer 4 (L4) (e.g., transport layer), and Layer 7 (L7) (e.g., application layer) of the Open Systems Interconnection (OSI) model of how data is transmitted over a network, customers can be provided with the ability to control egress at the network, transport, and/or application layers. For example, Layer 3 and Layer 4 egress control can provide the customer with the ability to restrict the outgoing traffic to specific IP address(es) and port(s), whereas Layer 7 egress control can provide the customer with the ability to control more restrictive filtering based on, for example, destination and requests content (e.g., a Uniform Resource Identifier (URI) path, query parameters, headers, etc.). Layer 7 controls can provide additional observability, such as providing the customer and/or the cloud data platform with the ability to tell which particular Representational State Transfer (REST) APIs were accessed, whereas Layer 3 and Layer 4 controls can provide logs about IP addresses and ports. For example, a Layer 3/Layer 4 egress control (e.g., L3/L4 egress rule) may include only allowing traffic to maps.googleapis.com at port 443; whereas a Layer 7 egress control (e.g., L7 egress rule) may include only allowing HTTP(S) GET requests to https://maps.googleapis.com/maps/api/geocode. As the example shows, using L3/L4 egress control can provide coarse-grained control for some L7 use cases, by enabling customers to state that the traffic should only go to maps.googleapis.com even if the customer cannot state which REST APIs are allowed.

In addition to L3/L4/L7 egress control, examples can provide for a secure egress path from the execution platform 110 to an egress proxy or proxy server, such as the proxy service 115. By providing a secure egress path, support for standard libraries for network access can be provided. Along with being transparent to the user code, a secure egress path 531 for UDx external access can also include strict egress isolation, strict egress control, and/or egress proxy enforcement. For example, the egress traffic from a sandbox 520, which can be the same as or similar to the sandbox process 420 as described and depicted in connection with FIG. 4, can be isolated from other sandboxes and existing execution platform workloads, while unauthorized egress traffic can be blocked and/or reported. In some examples, the egress proxy (e.g., proxy service 115) is the only gateway for any egress traffic from the execution platform 110, and the compute service manager 108 or component thereof is configured to enforce the egress proxy policy. In other words, the secure egress path is configured to redirect the traffic to the egress proxy as the egress gateway 541 to the Internet.

The above example requirements cannot be satisfied by allowing the sandboxed code to directly access the execution platform's network (e.g., eth0 device), and there are challenges to implement egress control directly on eth0 (e.g., a network interface device name to represent the first Ethernet network interface) without affecting other execution platform workloads. Therefore, an overlay network solution is proposed to establish this secure egress path (where the overlay network is described and depicted in detail in connection with FIG. 7).

Figure 6:
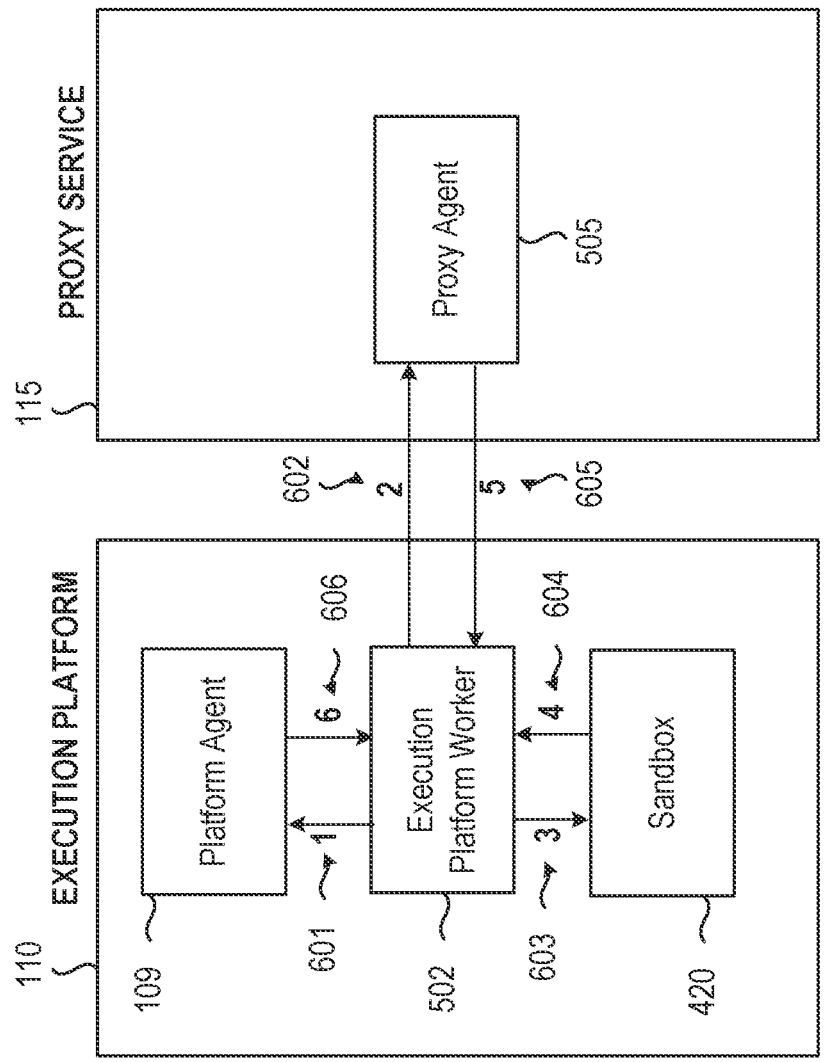
FIG. 6 is a block diagram illustrating an external function access system architecture, according to some example embodiments.

FIG. 6 is a block diagram illustrating an external function access system architecture 600 including a control flow for external access, in accordance with example embodiments. Example embodiments of the control flow include similar elements and components as depicted and described in connection with FIG. 5. To avoid obscuring the inventive subject matter with unnecessary detail, various functional components that are redundant to those described and depicted in connection with FIG. 5 have been omitted from FIG. 6. However, a skilled artisan will readily recognize that various additional functional components may be included as part of the system architecture 600 to facilitate additional functionality that is not specifically described herein.

The control flow starts at step 1 601, starting from the execution platform worker 502, the execution platform worker registers a policy at the platform agent 109. The platform agent 109 writes the policy and/or proxy information into one or more Berkeley Packet Filter (BPF) maps and/or extended BPF (eBPF) maps and creates (e.g., prepares) one or more network devices. The eBPF is a technology that allows developers to create and run custom programs that can be inserted into a Linux kernel to intercept and analyze system events. The BPF is used for packet filtering and network analysis, and the eBPF is used, for example, for a wide range of system monitoring and tracing scenarios. For example, using eBPF, developers can create programs that intercept system calls, kernel events, and/or network traffic, and modify and analyze the data in real-time or near real-time.

Returning to the execution platform worker 502, the control flow continues at step 2 602, where the execution platform worker 502 registers the policy at the proxy agent 505 of the proxy service 115. The proxy agent 505 writes the policy into the BPF maps.

From the execution platform worker 502, the control flow continues at step 3 603, where the execution platform worker 502 starts the sandbox process 420 subprocess. The sandbox process 420 subprocess can configure a Virtual Ethernet (veth) pair between the execution platform 110 and the sandbox process 420 (e.g., UDx executing, agents collecting events/logs, etc.).

From the sandbox process 420, the control flow continues at step 4 604, where the sandbox process terminates. The control flow continues at step 5 605, where the execution platform worker 502 unregisters from the proxy agent 505 and collects any events (e.g., violations). At step 5 605, the proxy agent 505 can clean the policy afterwards in case of an execution platform worker 502 crash or incident. Last in the control flow at step 6 606, the platform agent 109 similarly unregisters at the platform agent and collects events. At step 6 606, the platform agent 109 can clean the policy after, for example, an execution platform worker 502 crash or incident.

According to some example embodiments, an egress policy can contain a list of rules, where each rule defines an allowed endpoint. An endpoint may include multiple allowed IP addresses with a list of allowed ports.

```
::::::CODE::::::
[
  {
    "domain": "www.ex1.com",
    "ips": [
       "45.76.117.150"
    ],
    "ports": [
      {
        "port": "443-443",
        "protocol": "tcp"
      },
      {
        "port": "8080-8090",
        "protocol": "tcp"
      }
    ]
  },
  {
    "domain": "www.ex2.com"
    "ips": [
       "45.76.117.151",
       "45.76.117.153"
    ],
    "ports": [
      {
        "port": "443-443",
        "protocol": "tcp"
      }
    ]
  },
]
::::::CODE::::::
```

In some examples, the policy setup and cleanup, such as the execution platform setup of the policy for a veth ingress, can occur before launching the sandbox process 420. For example, the execution platform 110 can extract the egress policy from a token, such as a JSON Web Token (JWT) string and populate the BPF maps, such as a policy map and a query information map. The policy map can include information such as the sandbox identifier, destination IP address, destination port, and the like. The query information map can include information such as the sandbox IP address, the query identifier, the sandbox identifier, and the like.

The policy map, query information map, BPF maps or the like, can provide lookups to determine an allowed port. According to some examples, a policy key can be used in access control systems to determine whether a user or system is allowed to access a particular resource based on the policies associated with that resource. For example, a policy key can be a unique identifier used to associate a particular policy with a resource. In one example, a user can use a port in the policy key (e.g., flatten port range to each port in the policy key) in order to provide granular control over resource access based on specific policies. In additional examples, the cloud data platform can add additional map(s) to handle large port range lookups not easily provided in a policy key lookup.

In additional examples, a port range in the policy value can be used when the port range cannot be used as a key in the policy key. In such cases, the cloud data platform can introduce another inner map to store all policy rules. For example, the cloud data platform can use the sandbox identifier and destination IP address to find the inner map, and then lookup all rules inside the map. The inner map can contain the rules including port range, protocol, etc.

In additional examples, a source identity in a policy key can be used to specify a security policy for a particular network flow. Where the source identity is a component of the policy key that identifies the originator of the network flow, such as an IP address, MAC address, or other identifier. The source identity can be used to match the network flow to the appropriate security policy. According to one example embodiment, a sandbox identifier (sandboxId) can be used as the identity, with sandboxId as the source identity, the cloud data platform can unify the policy map definition in both the execution platform 110 and the proxy service 115. In an alternative example embodiment, the sandbox IP address can be used as the identity.

In additional example embodiments, a policy validation is the process of verifying that a policy or set of policies comply with certain criteria or requirements, which can be predefined rules, industry standards, best practices, or the like. Where the goal of policy validation is to ensure that policies are effective, consistent, and enforceable. Once a new packet reaches veth ingress at the execution platform 110 host, the code first looks up a QueryInfoMap to find the sandboxId using the source IP address, and then looks up a PolicyMap using the sandboxId to find the policy and validate the destination. If successful, the packet will be forwarded to a Generic Network Virtualization Encapsulation (GENEVE) tunnel with the queryId and sandboxId embedded into the GENEVE header. Otherwise, report the policy denied error message to eventMap. In another example, once a new packet reaches a GENEVE ingress, the code extracts the sandboxId from the header and looks up the policy to validate the destination. If successful, the packet is forwarded to eth0. Otherwise, the packet is dropped and/or this sandbox escape error is reported to the eventMap.

In further example embodiments, a UDx should be able to get the IP address of the destinations from hosts preconfigured by the sandbox process 420. However, an unexpected DNS request may happen if the UDx tries to reach an unexpected destination. Before terminating the sandbox process 420, the execution platform 110 or component thereof needs to perform an execution platform policy cleanup to delete policy entries from PolicyMap and QueryInfoMap using the sandbox srcIp as the key. In addition to the execution platform policy cleanup, the proxy service 115 can also perform a policy setup and/or cleanup. The proxy service 115 policy cleanup can be performed before terminating the sandbox process 420. For example, the execution platform 110 can send a policy unregister request to the proxy agent 505, and the proxy agent 505 can clean the policy in the policy map. In one example, a periodical background job can also be implemented to clean any out-of-date policies and/or report events. Additional examples can include a proxy policy refresh that happens on the execution platform 110, which should then register the refreshed policy again to the proxy service 115.

For example, the execution platform 110 registers the policy to a proxy, where the policy register request includes a signed JWT string and the queryInfo (queryId, sandboxId). The proxy agent 505 will need to verify the JWT using a token and consume the extracted policy. Afterwards, the proxy agent 505 will populate the PolicyMap, in a similar manner as described in as the one in the execution platform.

To enable external network access from a sandbox process in the execution platform 110, customized packet redirection and policy enforcement logic is implemented in eBPF program code. This eBPF code is compiled into binary files and attached to the ingress/egress side of different network interfaces so that each packet incoming to or outgoing from those network interfaces can be validated by the eBPF code. The cloud data platform or component thereof ensures that packets routed through the egress proxy (e.g., proxy service 115) and that the destination IP address is allowed as per the egress policies defined by the customer. This requires the population of several BPF maps with information about allowed destinations.

The eBPF code also needs to emit logging events or metrics to BPF maps for debugging and observability purposes. For example, a userspace program (e.g., an agent) needs to poll the events from the BPF map and emit logs and/or statistics to. Additionally, the agent needs to perform some cleanup work against the BPF map to maintain the runtime state. The userspace program or agent can be a new binary due to the way Linux Capabilities work. A binary needs CAP_BPF capability to be able to manage BPF maps. The capabilities are generally granted by Red Hat Package Manager (RPM) during installation. If a binary with capabilities is copied to a different location, the capabilities may be lost. If capabilities are assigned to the execution platform worker 502 process during execution platform RPM installation, the capabilities will stay with only that version of the execution platform binary. If the capabilities are lost due to copying, a TC_WRAPPER binary is created and installed via the RPM.

In addition, eBPF is a powerful kernel feature that can do more than just packet processing. For example, some other useful features of eBPF include system call tracing and security enforcement via Linux Security Modules (LSM) BPF that can unify all these use cases and leverage a single agent process that handles all eBPF related operations. The eBPF agent can additionally be used for malicious activity monitoring. The platform agent 109 can be the eBPF agent in the execution platform 110, and the agent binary can be granted the required capabilities. The platform agent 109 is further configured to set up network devices for external access so that all the networking setup is handled by a single executable.

In additional examples, the proxy agent 505 can be an eBPF agent in the proxy service 115 and ensure policy agent enforcement responsibilities. For example, the proxy agent 505 can poll logging and metrics from the BPF map and emit polling results to system log data or local servers. The proxy agent 505 can include policy cleanup actions, such as initiating and monitoring cleanup of connection tracking BPF map entries (e.g., in case of execution platform worker 502 failure), cleanup Source Network Address Translation (SNAT) BPF map entries, cleanup network devices used by the UDx external access, and the like. The proxy agent 505 can further initialize one or more GENEVE devices, including, for example, configuring GENEVE device IP forwarding and performing packet filtering to allow packets to be forwarded between network devices (e.g., veth, geneve0, eth0, etc.). The proxy agent 505 can initialize veth pair creation for UDx with external access and monitor or update BPF map values and data to be consumed by kernel BPF code.

In additional example embodiments, proxy errors on connection timeout at the execution platform 110 are described. Typically, the client side only sees connection timeout error, which gives very little information and guidance for how to move on. However, if the error occurs because of a proxy error, the proxy agent 505 or the execution platform 110 should be able to provide customers a better message to help them recover from such errors. For example, if the proxy service 115 is down, the proxy agent 505 can tell the customer that the "internal service is temporarily unavailable, retry later . . . " etc. In order to achieve this, the execution platform 110 needs to know if there is any error for the query on the proxy side and what are the errors that have occurred. For example, the execution platform 110 can send an unregister message to the proxy service 115 side after the execution is finished and before the sandbox is destroyed to trigger a policy map cleanup. The unregister message can include a query identifier and a sandbox identifier as part of the message fields, and the proxy agent 505 can maintain an error cache that caches all error messages detected for a query based on the messages polled from the event map. The proxy agent 505 can attempt to lookup all related error events, metrics, and/or logs using the queryId and sandboxId once an unregister request is received and surface them back in the response if there are any.

In additional example embodiments, a push error message is sent back from the proxy service 115 to the execution platform 110 as soon as it is detected. However, the message exchange happens after the UDx execution finishes, and in the case of a timeout, the customer needs to wait until the timeout to know the query has failed even if it is due to the cloud data platform internal service error. Example embodiments push the proxy error back to the execution platform 110 as soon as the error occurs, so that the execution platform 110 can fail the query immediately with proper errors. In one example, the proxy service 115 pushes the error event back at the application layer through a remote procedure call (e.g., gRPC) once the corresponding event is extracted.

In another example, the proxy service 115 redirects the package back to the execution platform 110 at the BPF layer and adds the error message in the GENEVE header. In this approach, the error message is added in the GENEVE header, and it reroutes the package back to the execution platform 110 directly. For example, the execution platform 110 can parse the GENEVE header at the BPF layer, and publish it as an error event, which will then be detected at the application layer. The error is served back to the customer from the execution platform 110 when the execution platform 110 is able to get the set of proxy errors, where the following table describes the proposed message mapping. Specifically, Table 1 is an example of proposed message mapping, according to the example above displaying an error to the customer and an error the execution platform 110 receives from the proxy service 115, as follows:

TABLE 1

| Error to Customer | Error Execution Platform Sees from Proxy |
|---|---|
| "Internal service temporarily unavailable, please retry later." | 1) Proxy down 2) Connection dropped due to table is full |

TABLE 1-continued

| Error to Customer | Error Execution Platform Sees from Proxy |
|---|---|
| "Internal service error, please contact cloud data platform." | All other proxy error |
| "Connection timeout, please check if the destination is valid, or contact cloud data platform." | No proxy error associated with the query ca nbe found. |

Figure 7:
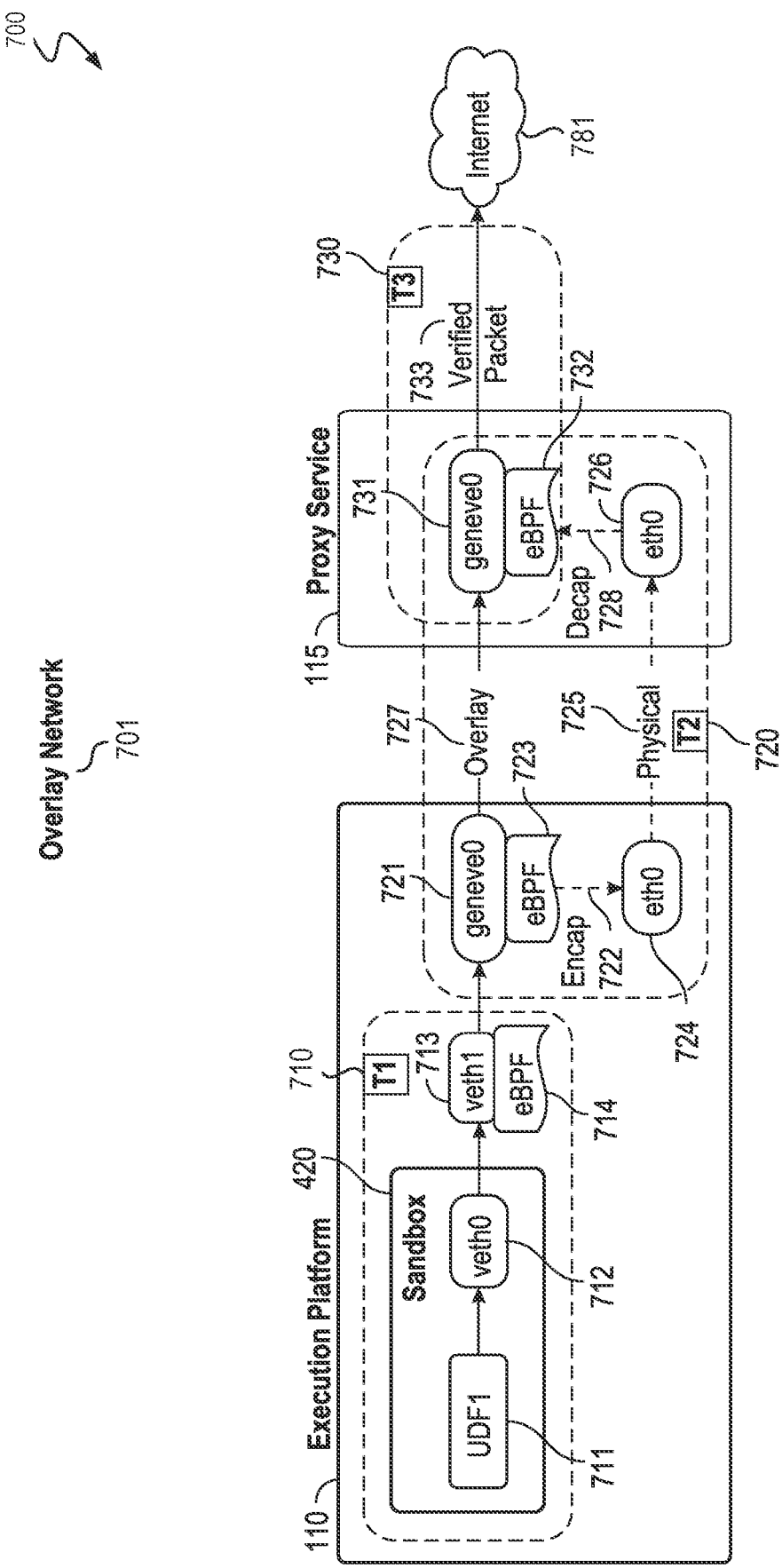
FIG. 7 is a block diagram illustrating a system architecture depicting an overlay network, according to some example embodiments.

FIG. 7 is a block diagram illustrating a system architecture 700 depicting an external access overlay network 701, in accordance with example embodiments. As noted above in connection with FIG. 5, the secure egress path for UDx external access must meet strict requirements including strict egress isolation, strict egress control, and/or egress proxy enforcement. Such requirements cannot be satisfied by allowing the sandboxed code (e.g., UDF1 711) to directly access the execution platform's 110 network (e.g., eth0 device 724) without affecting other execution platform workloads. Therefore, the overlay network solution of FIG. 7 is proposed to establish this secure egress path. The overlay network solution of FIG. 7 can be used to establish a secure egress path and can include the overlay network that is a virtual network of nodes and logical links built on top of an existing physical or virtual network. The overlay network 701 creates a new layer where traffic can be programmatically directed through new virtual network routes or paths (e.g., overlay 727) instead of requiring physical links (e.g., physical 725). It also enables the cloud data platform or components thereof to define and manage traffic flows irrespective of the underlying physical infrastructure.

FIG. 7 demonstrates the secure egress path from a sandbox (e.g., sandbox process 420) to an egress proxy (e.g., proxy service 115), which applies the overlay network to achieve egress control and isolation. For example, a packet sent on the secure egress path goes through three logical hops, where the hops (e.g., tiers) are highlighted by dashed lines as tier 1 (T1) 710, tier 2 (T2) 720, and tier 3 (T3) 730.

At tier 1 (T1) 710, the first step in enabling external access from the sandbox process 420 is to put an ethernet device in its namespace. As described above in connection with FIG. 6, example embodiments use Virtual Ethernet (veth) pairs for putting the ethernet device in its namespace. Virtual ethernet (veth) pairs allow communication between network namespaces. A veth pair is a pair of virtual network interfaces that are connected together in a manner that any traffic (e.g., data) sent through one interface of the veth pair is received by the other interface of the veth pair, in order to provide a way for isolated environments to communicate with each other and/or with a host system. For example, each veth pair can consist of two virtual network interfaces, which can be referred to as a "parent interface" and a "child interface." The parent interface can be attached to the host system and/or another network interface, whereas the child interface can be attached to a virtual machine or container. For example, when traffic is sent through the child interface of the veth pair, the traffic is transmitted to the parent interface of the veth pair, and then the traffic is transmitted to the destination network.

For example, at tier 1 (T1) 710, at one end of the veth pair, veth0 712 is put in the sandbox's namespace and at the other end, veth1 713 is put in the execution platform's 110 default namespace. Any packet transmitted on veth0 712 is immediately received on veth1 713 and vice-versa. For packets arriving on veth1 713, the system ensures that their destination is allowed by the egress policy by attaching one or more extended Berkeley Packet Filter (eBPF) hooks 714 to the veth1 713 device. eBPF hooks can include a type of eBPF program used to intercept and/or modify system calls and/or other kernel events by allowing developers to monitor and control system behavior in real-time or near real-time.

For example, the eBPF can include an in-kernel virtual machine that allows code execution in the kernel space. It can be used to complement or replace kernel packet processing among other things. The eBPF hook 714 on veth1 713 guarantees that only packets with allowed destinations can be forwarded to the next hop (e.g., geneve0 device 721). Otherwise, packets are dropped, and the violation is reported. This also guarantees that no packet can be sent to other sandboxes or execution platform 110 instances.

At tier 2 (T2) 720, after getting the packet out of the sandbox process 420 and validating that its destination is allowed, the system needs to send the packet to the egress proxy, proxy service 115. GENEVE tunneling is used for T2 720. In virtualized environments, such as the virtualized environment of FIG. 7, GENEVE (Generic Network Virtualization Encapsulation) can include a network tunneling protocol used for transmitting network traffic between or among virtual machines over an IP network. A GENEVE device can include a virtual network device that implements the GENEVE protocol and is used to provide overlay networks that span multiple physical hosts or clusters. GENEVE encapsulates packets within UDP packets, for example, and uses network virtualization headers to allow multiple virtual networks to be transmitted over the same physical network infrastructure (e.g., physical 725). GENEVE encapsulation is further described and depicted in connection with FIG. 8. While GENEVE devices and packetization are used in the example embodiment of FIG. 7, it will be understood to those skilled in the art, that embodiments and examples of the inventive subject matter can be practiced with other network tunneling protocols. At T2 720, the system uses GENEVE to embed a policy identifier for each packet so the proxy service 115 can use that information to perform further granular egress control.

At tier 3 (T3) 730, the egress proxy, proxy service 115, serves as a security barrier and the only egress gateway (such as egress gateway 541) from the execution platform 110. When a packet is received on the GENEVE device geneve0 731 in the proxy service 115, the packet is decapsulated 728 to retrieve the original packet 732 and the policy ID. The policy ID is used to look up the egress policy and validate that the original destination (e.g., maps.google.com's IP address) is allowed. This validation generates a verified packet 733 and is effectively identical to what is performed at veth1 713 in the execution platform 110. This second check is used to prevent a compromised execution platform 110 (e.g., "zero trust execution platform") from exfiltrating data. Any violations will be reported to security. If the packet passes all the checks, the system changes the packet's source address from the sandbox IP address to an egress proxy IP address using Source Network Address Translation (SNAT). This needs to be done because the sandbox IP address is a private IP address and is not generally routable, and a routable IP address is needed for the response packet to be transmitted to the Internet 781 using UDx external access. The system maintains a connection map so that it can correctly identify the target execution platform and sandbox instance for the response packet. These 3 parts, Tiers 1-3 together, ensure that the traffic from the sandbox process 420 is well isolated and can only go to the allowed destinations of the Internet 781.

In additional example embodiments, statically resolving hostnames in the compute service manager 108 is explored. The L3/L4 based egress control discussed above is based on IP addresses. However, almost every Internet connection starts with a DNS, so it is critical to secure domain name resolution from a UDx, especially to avoid data exfiltration over DNS. In such additional examples, the hostname resolution is performed in the compute service manager 108 at the start of the query and the mapping is sent to the execution platform 110 in an egress policy document. The eBPF based network can enforce the IP restrictions based on this static mapping. The mapping can also be used to populate the hosts file inside the sandbox. For allowed destinations, hosts can be used for name resolution. If DNS resolution is attempted for a disallowed name, eBPF code can drop the DNS packet and report user error. This static approach can be used in most of the use cases explored herein as the jobs are usually short-lived. However, for services using DNS for failover or load balancing (e.g., round robin), this approach may not be optimal, and a mitigation is to select an appropriate Time To Live (TTL) field in the IP header of the packet to indicate the maximum number of hops that a packet can travel before it is discarded by a gateway in order to refresh the IP list.

Additional example embodiments of the overlay network 701 can include allowing dynamic DNS resolution at runtime from the UDx and supporting a custom DNS resolver. For example, an account administrator can specify the allowed DNS resolvers in the allowlist (e.g., allowed host list) such that the DNS requests pass the egress control. In another example, the system can implement a dedicated DNS resolver at a secure location (e.g., proxy service 115), and proxy all hostname lookups from one or more UDx. For example, the system can provide a local DNS proxy with networking and security capabilities for containerized applications using eBPF technology to enable fast and secure communication between containers.

While the example of FIG. 7 describes the use of the overlay network in reference to external access, it will be understood by those having ordinary skill in the art that the overlay network described herein can further be used internally by components of the cloud data platform. For example, this system, in addition to being used for external access, can be used to allow for instances of the same workload or related workloads to communicate with each other over example embodiments of an overlay network. For example, one or more sandbox instances of the same job can be configured to communicate with each other over the overlay network described herein.

Figure 8:
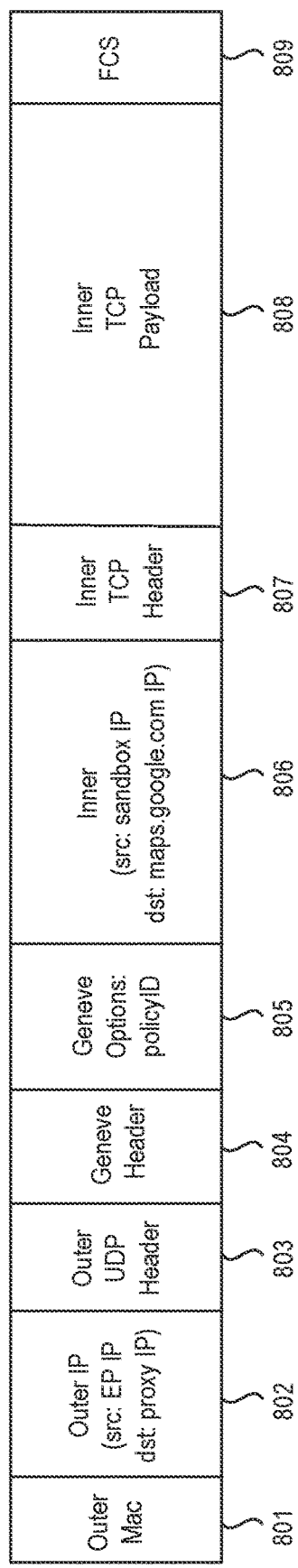
FIG. 8 is a block diagram illustrating GENEVE encapsulation, according to some example embodiments.

FIG. 8 is a block diagram illustrating GENEVE encapsulation 800 as used in FIG. 7, in accordance with example embodiments.

GENEVE encapsulation protocol is an encapsulation protocol implemented in Linux to create a tunnel between two network devices. As noted in FIG. 7, in virtualized environments, GENEVE can include a network tunneling protocol used for transmitting network traffic between or among virtual machines over an IP network. GENEVE is implemented herein as it uses User Datagram Protocol (UDP) as the transport protocol and encapsulates the original packet as the payload, thereby allowing the cloud data platform to set a different destination while providing the flexibility to customize its metadata.

A packet encapsulated in the GENEVE format as described in FIG. 8 includes a tunnel header encapsulated in UDP over IP. The GENEVE format includes an outer Media Access Control (MAC) address 801 providing the source or destination address in the outermost layer of a network packet header. In GENEVE format, the outer IP 802 refers to the IP header of the outermost layer of the encapsulated packet including a source execution platform IP address and a destination proxy IP address. The outer UDP header 803 refers to the UDP header of the outermost layer of the encapsulated packet, which can include information about the source and destination UDP ports, among other information.

The GENEVE header 804 includes several fields including, for example, the version of the GENEVE protocol, the variable-length options, the encapsulated protocol, the virtual network identifier (VNI), among other information. The GENEVE options 805 are used to provide additional information about the encapsulated packet, such as, for example, a policy identifier (ID). The GENEVE inner 806 refers to the original packet that is being encapsulated and transmitted over the virtual network. In the examples of FIGS. 7 and 8, the inner includes a source address including the sandbox IP address and a destination address, such as the maps.google.com IP address. The purpose of encapsulating the inner packet within the GENEVE header is to allow the virtual network to maintain the same level of isolation, security, control, and performance as a physical network. The inner 806 can be decrypted and processed by the receiving device once it has been decapsulated from the GENEVE header as described above in connection with FIG. 7.

The inner transmission control protocol (TCP) header 807 is the header of the original TCP packet that is being encapsulated and transmitted over the virtual network. The inner TCP payload 808 is the actual data that is being transmitted within the TCP packet that is being encapsulated and transmitted over the virtual network. When the TCP packet is encapsulated within a GENEVE header, the entire packet, including the TCP header and payload, becomes the inner packet. Last in the GENEVE encapsulation format is the frame check sequence (FCS) 809, which refers to the cyclic redundancy check value that is added to the end of the packet to ensure integrity of the packet during transmission.

Figure 9:
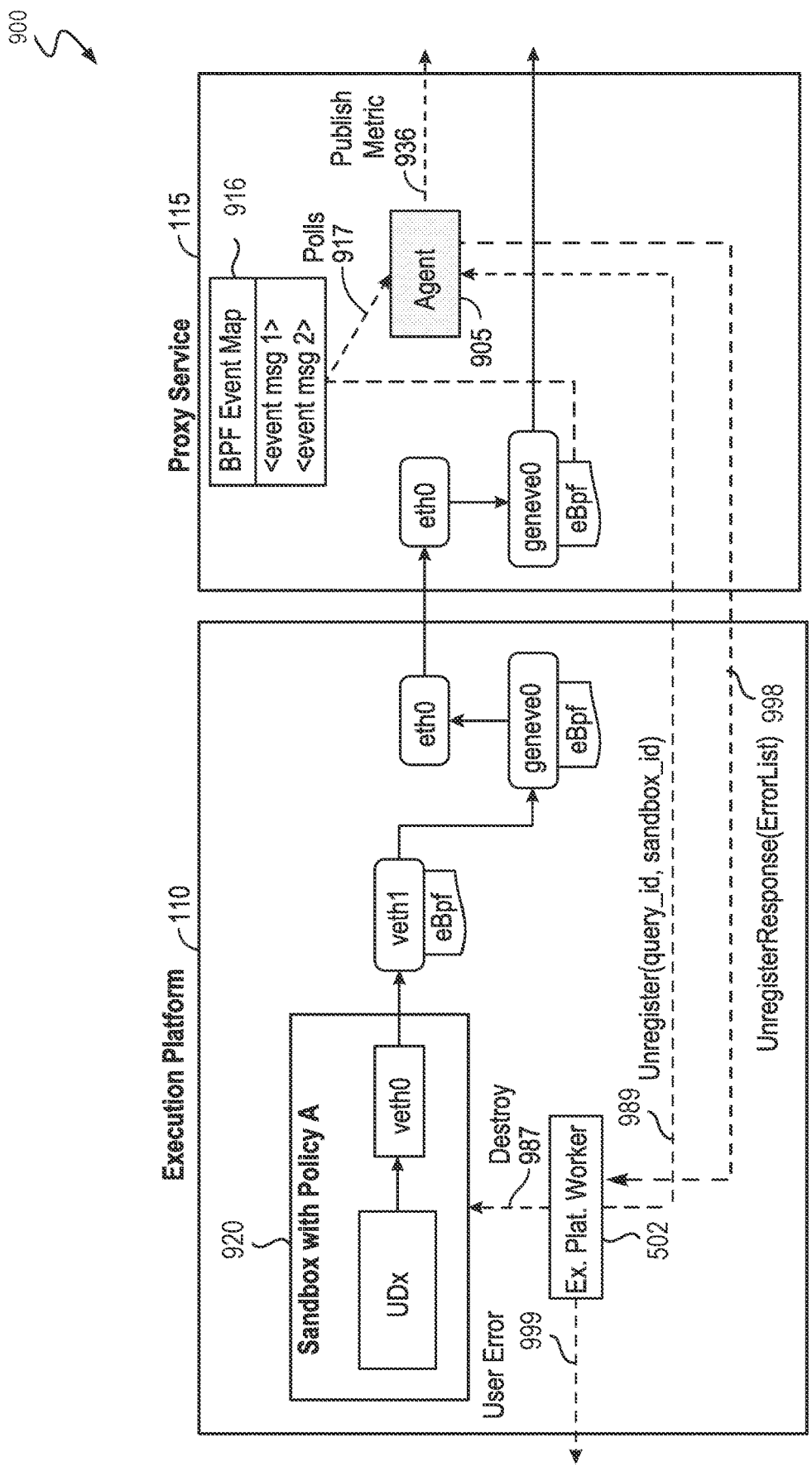
FIG. 9 is a block diagram illustrating a high-level overview depicting the flow of metrics and events, according to some example embodiments.

FIG. 9 is a block diagram of an environment 900 illustrating a high-level overview graph depicting the flow of metrics and events from the BPF layer to the customer including proper processing, in accordance with example embodiments. In some examples, the environment 900 can include some or all of the same components as in the system architecture 700 depicted and described in connection with FIG. 7. FIG. 9 is similar in many respects to FIG. 7, sharing certain similar features and components; for brevity, only specific elements are detailed and described with reference to FIG. 9. To avoid obscuring the inventive subject matter with unnecessary detail, various functional components that are not germane to conveying an understanding of the inventive subject matter have been omitted from FIG. 9. However, a skilled artisan will readily recognize that various additional functional components may be included as part of the environment 900 to facilitate additional functionality that is not specifically described herein.

In the execution platform 110, the sandbox with policy A 920, which can be similar to sandbox process 420 as described and depicted in connection with FIGS. 4 and 7, includes a UDx and veth0 as described and depicted in connection with FIG. 7.

In the proxy service 115, the agent 905, such as proxy agent 505 as described and depicted in connection with FIG. 5, can be configured to poll an event map, such as BPF event map 916, to extract events and metrics, perform proper processing, and log proper messages for debugging purposes and/or publish the metric as the cloud data platform metrics. The polls 917 can be forwarded to the agent 905 from the BPF event map 916. The agent 905 transmits to the execution platform worker 502, an error list 998 that can include, for example, unregistered responses.

In response to receiving the error list 998, the execution platform worker 502 can provide one or more error messages 999 to a client device of a user of the cloud data platform. In addition, the execution platform worker 502 can send a destroy message 987 to sandbox with Policy A 920 to initiate a cleanup of any policies and to destroy the corresponding sandbox. Once the UDx computation is complete, the execution platform 110 work will destroy the corresponding sandbox. Meanwhile, the execution platform worker 502 transmits an unregister message 989 that can include, for example, a query identifier and a sandbox identifier to the agent 905 (e.g., to unregister the policy with query_id and sandbox_id).

Once the agent 905 receives the unregister message 989, the agent 905 will look-up the error caching to extract all error metrics associated with the query and surface them back to the execution platform 110 in the responses. Proper mapping cleanup will also be performed. The agent 905 publishes metrics 936. Once the execution platform 110 receives the response, it will perform an analysis based on all the error results it has (e.g., including both execution platform errors and/or proxy service errors), and determine what is the proper error the execution platform 110 should surface back to the customer in user error message 999.

The proxy service 115 can generate and log useful metrics and events that can be used to improve the developer, customer, and/or use experience. The BPF event map 916 can be employed to pass events and/or metrics from the BPF layer to the application layer, and similarly be adapted for the proxy service. For example, a BPF metric can be written in a signal map and published with the cloud data platform metrics. Table 2 (below) shows a few examples of debugging and error metrics according to example embodiments; however, additional metrics and/or events can be captured and logged according to the present disclosure. Table 2 is an example of different categories of metrics, according to some examples, including a combination of BPF metrics, startup metrics, runtime metrics, termination metrics, and the like, as follows:

TABLE 2

| Metric Name | Metric Description |
| --- | --- |
| SignalNatFillUp | Potential congestion on NAT table. Cloud data platform should be alerted. |
| SignalCTFillUp | Potential congestion on connection track (CT) table. Cloud data platform should be alerted. |
| ExternalFunc-ServerCreateTime | The duration between creating the UDF server and starting the UDF server subprocess. Helps cloud data platform and/or user to understand the cost of preparing the UDF server. |
| ExternlFunc-ServerStartupTime | The duration between starting the UDF server subprocess and the last client has connected. |
| FuncArrow-SerializeTime | The total duration for arrow serialization and deserialization at the execution platform. |
| FuncShut-downTime | The total duration to terminate the sandbox subprocess. |

Table 2 includes example metric names and descriptions that can help the cloud data platform and/or the user identify, monitor, and respond to performance management issues in production. For example, providing metrics for understanding the sandbox overhead, such as the startup latency for different components inside the sandbox or understanding runtime overhead.

The rest of the events can be written in one or more event maps, such as BPF event map 916, where the messages written in the event map can contain fields in common. Metrics, events, and other logs can be added, changed, and/or deleted based on the user preferences and/or cloud data platform evolutions. According to some examples, the eBPF code writes metric and/or event messages triggered by error or debugging/monitoring purposes to the BPF event map. Once the metric and events are published (e.g., publish metric 936), one of the most important things is how to associate each metric/event with the query that initiates the connection.

According to one example, an identifier for associating the metric and/or event with the query is provided using the query ID and the sandbox ID. With this option, an identifier constructed by using <query_id><sandbox_id> is used, where this identifier can be globally unique, and can be directly associated with the query and policy used by the sandbox with Policy A 920. However, the query ID and the sandbox ID are identifiers that the execution platform 110 knows, and the information that can be extracted at the proxy side can include a source IP address (e.g., the execution platform IP), a source port, a destination IP address, and a destination port. In order to associate all of that information together, extra processes may need to be performed.

Figure 10:
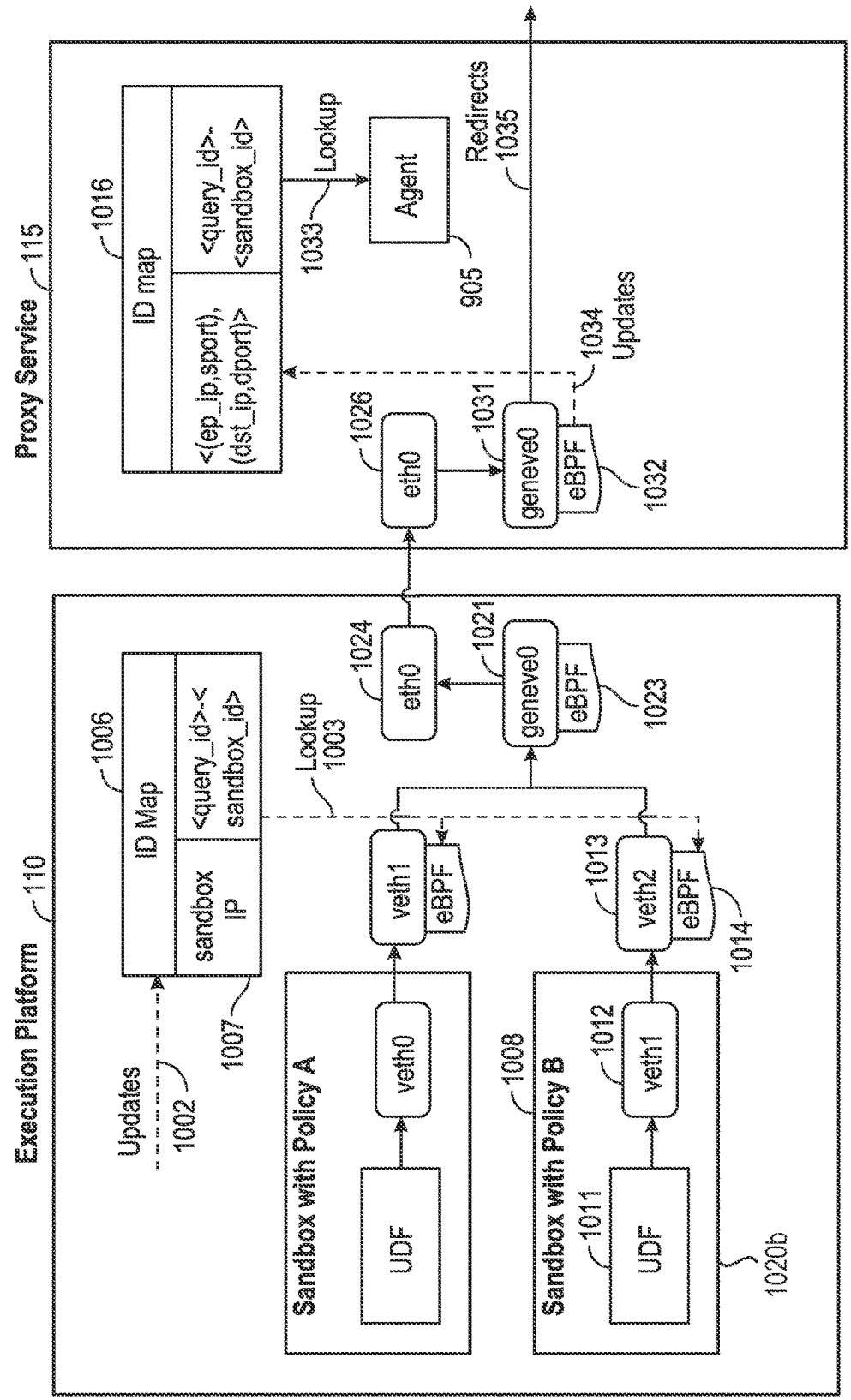
FIG. 10 is a block diagram illustrating a high-level overview depicting eBPF mapping, according to some example embodiments.

FIG. 10 is a block diagram of an environment 1000 illustrating a high-level overview depicting the flow of metrics and events from eBPF layer to the customer, in accordance with example embodiments. In some examples, the environment 1000 can include some or all of the same components as in the system architecture 700 depicted and described in connection with FIG. 7 and/or the environment 900 depicted and described in connection with FIG. 9. FIG. 10 is similar in many respects to FIGS. 7 and 9, sharing certain similar features and components; for brevity, only specific elements are detailed and described with reference to FIG. 10. To avoid obscuring the inventive subject matter with unnecessary detail, various functional components that are not germane to conveying an understanding of the inventive subject matter have been omitted from FIG. 10. However, a skilled artisan will readily recognize that various additional functional components may be included as part of the environment 1000 to facilitate additional functionality that is not specifically described herein.

FIG. 10 describes how the traffic would flow when a package is sent from the execution platform 110 to the Internet (a similar flow would be applied for packages coming back). As shown in FIG. 10, the execution platform 110 and the proxy service 115 can both maintain an ID map 1006, 1016 using, for example, BPF maps.

The ID map 1006 at the execution platform 110 side includes a sandbox IP 1007 as a key, and the identifier (<query_id><sandbox_id>) as a value. The execution platform 110 performs updates 1002 on the ID map 1006 whenever a sandbox is created, destroyed, updated, or the like. The eBPF code 1014 can initiate a lookup 1003 of the identifiers with the sandbox IP 1007 while processing a package and encodes the identifier as part of the GENEVE header in geneve0 1021.

The ID map 1016 at the proxy service 115 side includes <(ep_ip, sport), (dst_ip, dport)> (e.g., the execution platform IP address, the source port, the destination IP address, and the destination port) as a key, and the identifier (<query_id><sandbox_id>) as value. The eBPF code 1032 at geneve0 1031 can parse the header to retrieve the identifier and provide updates 1034 to the ID map 1016. The agent 905 can perform a post-processing lookup 1033 of the ID map 1016 to associate each metric/event with the identity before logging or publishing, if an entry can be found. In some implementations, this is just best effort as some metrics may not be able to find an associated identifier depending on if the map has been updated when the metric/event is published. Example embodiments enable easy association of the debugging metric(s) and/or event(s) with a problematic query based on the query identifier information. The same identifier can be used for the policy map at both the proxy service 115 and/or the execution platform 110.

In additional example embodiments, the environment 1000 illustrating a high-level overview depicting the flow of metrics and events uses the execution platform 110 IP address and the sandbox 1020b (with Policy B) IP address <ep_ip><sandbox_ip> as the identifier for each metric/event. The execution platform 110 IP address can be read directly from the socket buffer <sk_buff> data structure at the proxy service 115 side, but not the sandbox IP address. Therefore, the sandbox IP address will still need to be passed from the execution platform 110 ID map 1006 to the proxy service 115 via the GENEVE header. The metric only contains IP information, so the IP address still needs to be mapped to the corresponding query manually during debugging.

According to an implementation of FIG. 10, the traffic flow from the execution platform 110 to the proxy service 115 can include the following example. Starting at the execution platform 110, the sandbox 1020b (with policy B 1008) includes user-defined function (UDF) 1011, where the sandbox process configures a virtual ethernet (veth) pair between the sandbox 1020b (e.g., veth1 1012) and the execution platform 110 (e.g., veth2 1013). Once a new packet reaches veth2 1013 ingress at the execution platform 110 host, the eBPF code 1014 performs a lookup 1003 of the ID map 1006 to locate the <sandbox_id> using the source IP address, and then looks up a PolicyMap using the <sandbox_id> to find the associated policy (e.g., Policy B 1008) and validate the destination.

If successful, the packet will be forwarded to a GENEVE tunnel (e.g., geneve0 device 1021) with the <query_id> and the <sandbox_id> embedded into the GENEVE header. The eBPF code 1023 attached to the egress side of the geneve0 device 1021 can perform NAT on the inner packet to change the source IP address stored in the GENEVE header to the eth0 1024 IP address. Next, the kernel can encapsulate this packet with metadata from the GENEVE tunnel-related data including a remote IP address of the proxy service 115. The BPF redirect 1035 code is called to redirect the encapsulated packet to the egress side of the geneve0 device 1031 on the proxy service 115, and the encapsulated packet is transferred to the eth0 1026 on the proxy service side. The eBPF code 1032 attached to the ingress side of geneve0 1031 performs a series of tasks (described in detail in connection with FIG. 12) to decapsulate the packet and route it based on the destination IP address.

Figure 11:
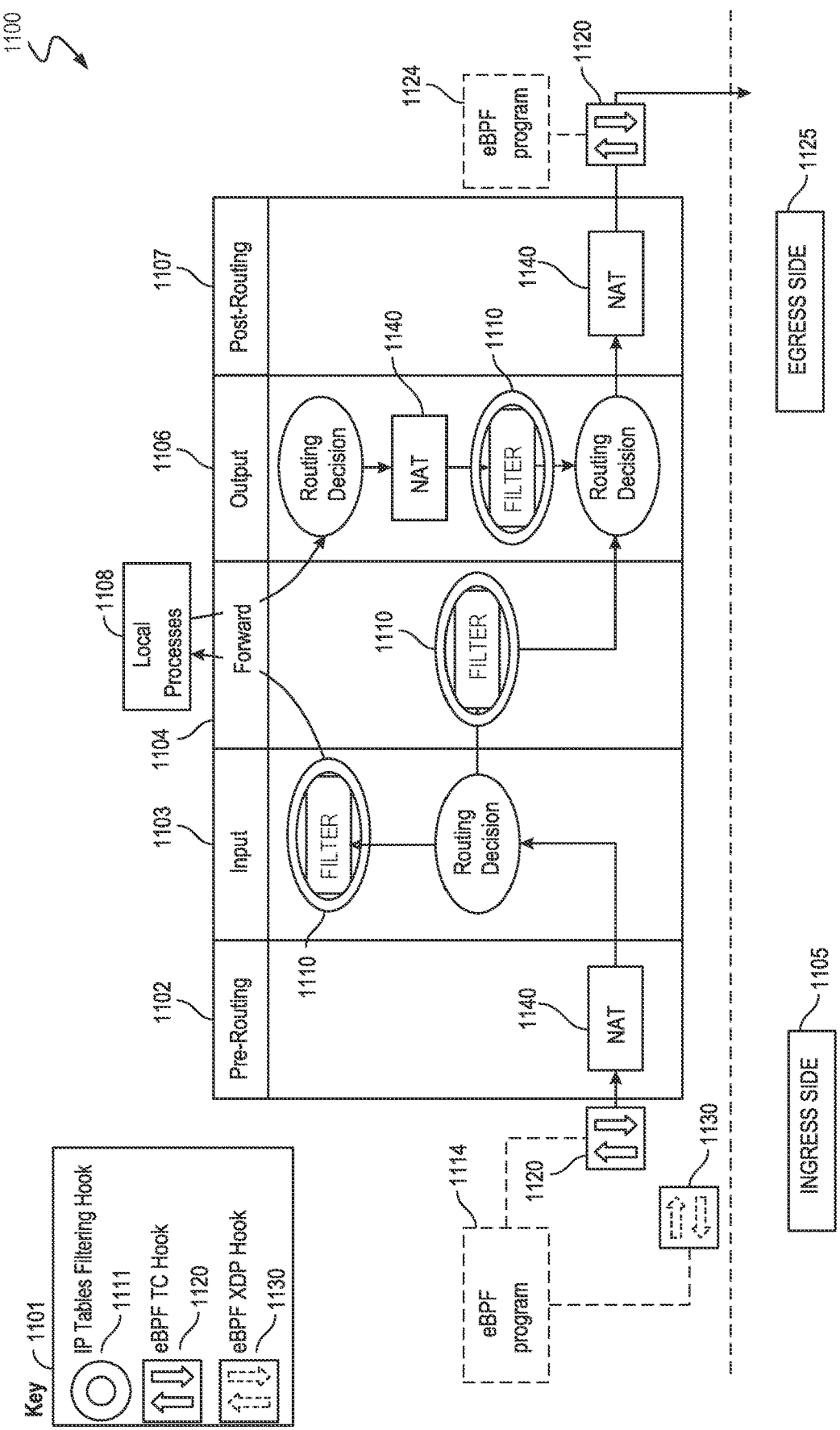
FIG. 11 is a block diagram illustrating eBPF-based packet routing, according to some example embodiments.

FIG. 11 is a block diagram 1100 illustrating eBPF-based packet routing, of traffic control eBPF processing versus local network stack processing, in accordance with example embodiments. The example depicted in the block diagram 1100 demonstrates how a packet can be routed from the execution platform sandbox (e.g., a separate network namespace) to the public Internet and the packet returned path. Some examples can demonstrate the network interfaces employed on the execution platform 110 and/or egress proxy, such as the proxy service 115, as well as the eBPF program(s) that are attached to each network interface, where the eBPF is an in-kernel virtual machine that allows code execution in the kernel space. FIG. 11 includes a key 1101 depicting three symbols, including IP tables filtering hook 1111, an eBPF TC hook 1120, and an eBPF XDP hook 1130, each of which is used on the ingress side 1105 and the egress side 1125 of the block diagram 1100.

The eBPF programs 1114, 1124 can run sandboxed programs in an operating system kernel. It is used to extend the capabilities of the kernel safely and efficiently without requiring changing kernel source code or load kernel modules. Especially in the network domain, eBPF program provides programmability for cloud native world to define networks using software. In addition, eBPF also provides both safety and efficiency. It is significantly more secure than loading a kernel module by requiring eBPF programs to pass through a verification process; and the efficiency is guaranteed by a Just in Time (JIT) compiler that ensures native execution speed of eBPF bytecode. Lastly, using eBPF provides the benefit of isolation. Compared to IP tables or IP route, eBPF programs only need to attach to the newly introduced network devices (e.g., veth and GENEVE), and other existing network devices used in the execution platform 110 will not be affected.

As described below in connection with FIG. 11, the eBPF can be a program that can be executed inside a kernel for tracing, monitoring, and processing one or more packets. There can be various hook point(s) inside the kernel that allow for attaching eBPF program(s) to the veth device(s). The traffic control (TC) can include a tool for manipulating packets at a really low level. For example, it can attach an eBPF program to a network device on both the ingress side and/or the egress side. On the ingress side 1105, eBPF program 1114 can be executed before a packet is handed to the local network stack. Similarly, on the egress side 1125, the eBPF program 1124 is executed after the local network stack has finished processing (e.g., local processes 1108. The GENEVE encapsulation protocol, such as the examples described and depicted in connection with FIGS. 7 and 8, is the encapsulation protocol implemented in Linux to create a tunnel between two network devices. Although it will be understood by those having skill in the art that other encapsulation protocols can be implemented according to varying example embodiments.

According to some examples, a high-level logical architecture is depicted in the block diagram 1100. All transmission control protocol (TCP) packets and user datagram protocol (UDP) packets coming out from the UDx sandbox can be routed through an egress proxy. Traffic control (TC) can attach some or all eBPF programs on the ingress side 1105 and/or the egress side 1125 of the network interfaces created on the execution platform 110 and proxy host(s). The eBPF program(s) will primarily be performing packet encapsulation and/or decapsulation for a tunnel between the execution platform 110 and the proxy service 115, packet redirect between network interfaces on the same host, SNAT (e.g., source IP network address translation) on one or more proxy host(s) before the packet is sent to the public Internet, policy enforcement based on the policy identifier (e.g., policy_ID) that is embedded in the encapsulated packet header, and the like.

According to some examples, the egress proxy, such as a proxy service 115, is in communication with the execution platform 110, but not the compute service manager 108. A UDx manager (e.g., UDFNetManager) running on each execution platform host is provisioned to assign IP addresses to the sandbox process 420, such that the IP address inside the network namespace of the sandbox is unique within a single host. Further examples include the IP address inside the network namespace of the sandbox to be the same across different execution platform instances, where those instances can be going through the same or different egress proxies. Thus, in order to uniquely identify a sandbox environment from the egress proxy, the cloud data platform needs a tuple of the execution platform IP address and the sandbox namespace IP address.

According to some examples, Network Address Translation (NAT) 1140 and/or Source IP NAT (SNAT) are important components to forward packets to the public Internet because each sandbox on the execution platform will be assigned a private IP address. To make sure returned packets can reach back to the sandbox, the proxy needs to implement NAT/SNAT. According to the present disclosure, there are three example methods that are implemented according to this functionality.

In a first example embodiment, two-level NAT translation using eBPF code can be implemented by translating a private IP address in a sandbox to the execution platform IP address. Then in the proxy host, translate the execution platform IP address into proxy IP addresses to access public Internet. In this approach, NAT as well as connection tracking can be implemented completely inside the eBPF program.

In a second example embodiment, two-level NAT translation using IP tables can be implemented by translating a private IP address in a sandbox to the execution platform IP address. Then in the proxy host, it translates the execution platform IP address into proxy IP address to access public Internet. Both translations can leverage IP tables.

In a third example embodiment, the compute service manager 108 is configured to manage IP address mapping, where NAT only needs to be done once leveraging IP tables in the proxy host. In the third example embodiment, the compute service manager needs to implement an IP assignment service to assign a unique IP to each sandbox. During the assignment, the compute service manager also needs to record a mapping between the execution platform IP and this unique IP. The example further includes the egress proxy host needing to talk to the compute service manager to ask about the mapping between sandbox IP and the execution platform IP. In the forward path, the egress proxy will leverage IP tables to translate the sandbox IP address to an egress proxy host IP. In the returned path, the egress proxy will need to ask the compute service manager 108 about the execution platform 110 IP address that the destination sandbox IP belongs to and then perform the packet encapsulation.

The logical architecture of FIG. 11 provides for five stages of processing including a pre-routing stage 1102, an input stage 1103, a forward stage 1104, an output stage 1106, and a post-routing stage 1107. The NAT/SNAT 1140 is performed during the pre-routing stage 1102, output stage 1106, and post-routing stage 1107. The filtering processes 1110 are performed during the input stage 1103, the forwarding stage 1104, and the output stage 1106. The filtering processes can include the use of IP tables filtering hooks 1111. On the ingress side 1105, the eBPF program 1114 receives input from the eBPF XDP hook 1130 and provides output to a connected eBPF traffic control hook 1120, which then routes information into the pre-routing stage 1102. On the egress side 1125, the post-routing stage 1107 provides output to the eBPF traffic control hook 1120, which is connected to the eBPF program 1124.

Figure 12:
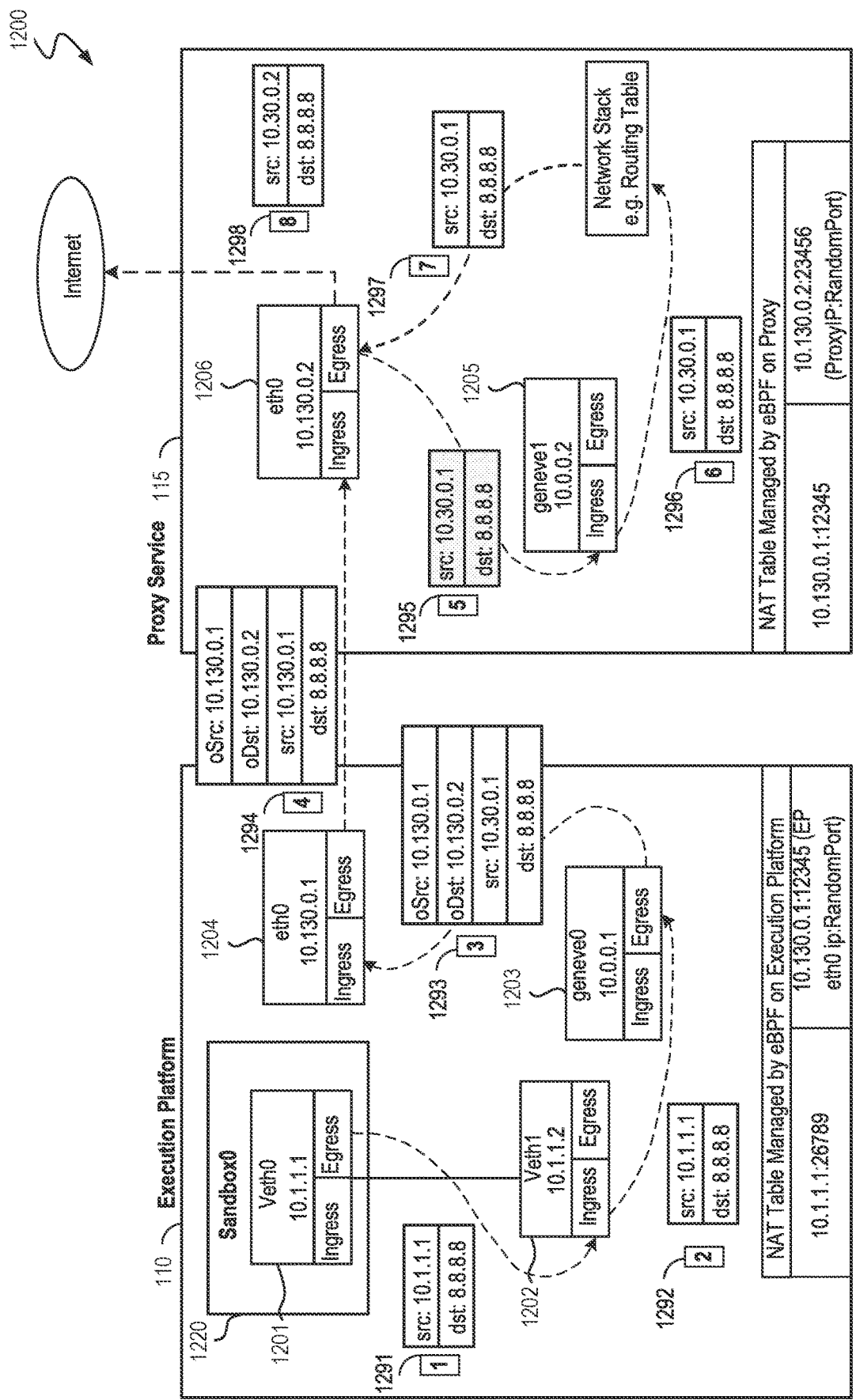
FIG. 12 is a block diagram illustrating a packet routing diagram, according to some example embodiments.

FIG. 12 is a block diagram illustrating a packet routing diagram 1200 depicting how a packet is routed from the execution platform 110 to the proxy service 115, in accordance with example embodiments. More specifically, FIG. 12 shows how a packet is routed from a sandbox (e.g., 10.1.1.1) in an execution platform 110 to a remote destination (e.g., 8.8.8.8).

The packet routing diagram 1200 begins with a virtual ethernet (veth) pair being created. At step 1 1291, one end of the veth pair (e.g., veth0 1201) is moved to the network namespace inside the sandbox0 1220 while the other end of the veth pair (e.g., veth1 1202) remains on the host. Routing tables inside the sandbox0 1220 namespace will default route any packet to use veth1 1202 IP address 10.1.1.2 as the gateway. So, a packet will be transmitted from veth0 1201 and received by veth1 1202.

At step 2 1292, an eBPF program is attached to the ingress (e.g., received) side of veth1 1202, and this eBPF program will perform certain tasks. For example, the eBPF program can perform one or more of the following tasks: (A) Check against a policy on whether the packet from sandbox0 1220 is allowed to access 8.8.8.8. If the packet is not allowed access, the eBPF program will drop the packet and send an event to the user-space application. (B) Set GENEVE tunnel related data to prepare for packet encapsulation, where the data includes, for example, a remote IP address of a proxy service and customized metadata (e.g., policy_ID and execution platform IP address). (C) Call bpf_redirect to redirect the packet to the egress side of geneve0 device 1203.

The packet routing diagram 1200 continues at step 3 1293 with an eBPF program being attached on the egress side of the geneve0 device 1203, which will SNAT the inner packet to change the source IP address to the eth0 1204 IP address of the current execution platform box. Next, the kernel can encapsulate this packet with the metadata set by task (B) noted above.

At step 4 1294, the encapsulated packet is transferred on wire. At step 5 1295, actual packet decapsulation is performed by the kernel (e.g., no eBPF code needs to be attached). At step 6 1296, an eBPF program is attached to the ingress (e.g., receiving) side of geneve1 device 1205, and this eBPF program will perform following tasks: (A) Check against one or more policies based on the policy identifier as to whether the packet should be allowed or blocked. If the packet should be blocked, drop the packet, and treat this attempt as a security incident. (B) Let the packet go through the local network stack, with no redirect.

The packet routing diagram 1200 continues at step 7 1297, with the packet being routed based on the destination IP address (e.g., 8.8.8.8), which will go through the default routing rule on the proxy host and will be transmitted under eth0 1206. At step 8 1298, an eBPF program will be attached on the egress side of eth0 1206, which will SNAT from the execution platform eth0 1206 IP address to the proxy service 115 eth0 1206 IP address.

Figure 13:
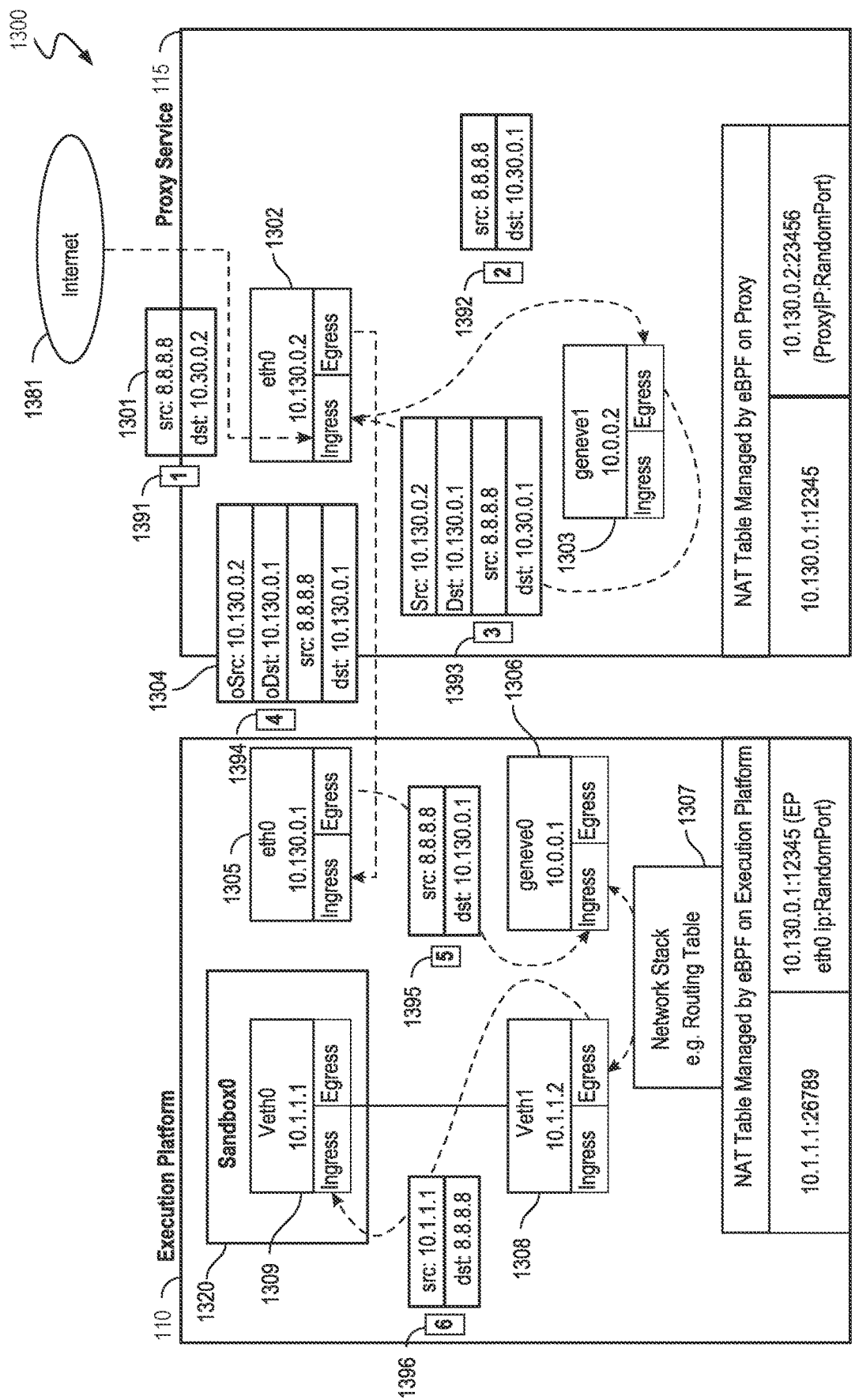
FIG. 13 is a block diagram illustrating a packet routing diagram depicting how a returned packet is routed, according to some example embodiments.

FIG. 13 is a block diagram illustrating a packet routing diagram 1300 depicting how a returned packet is routed back to sandbox0 1320 (e.g., 10.1.1.1) from a remote source 1301 (e.g., 8.8.8.8), in accordance with example embodiments. In some examples, the packet routing diagram 1300 can include some or all of the same components as in the packet routing diagram 1200 depicted and described in connection with FIG. 12. FIG. 13 is similar in many respects to FIG. 12, sharing certain similar features and components; for brevity, only specific elements are detailed and described with reference to FIG. 13. To avoid obscuring the inventive subject matter with unnecessary detail, various functional components that are not germane to conveying an understanding of the inventive subject matter have been omitted from FIG. 13. However, a skilled artisan will readily recognize that various additional functional components may be included as part of the packet routing diagram 1300 to facilitate additional functionality that is not specifically described herein.

The packet routing diagram 1300 begins at step 1 1391 with remote upstream transmitting a packet back to an egress proxy server, such as proxy service 115. At step 2 1392, an eBPF program will be attached to the ingress side of the eth0 1302 interface. The program will perform the following actions: (A) Check the destination port number on the packet and look up the NAT table maintained by the cloud data platform. If there is no entry with the corresponding port number, let the packet proceed. (B) If there is an entry found in the NAT table, then lookup the original execution platform IP address. (C) Overwrite the packet destination IP address to match the execution platform IP address. (D) Set up GENEVE encapsulation metadata (e.g., remote IP address, execution platform IP address, etc.). (E) Redirect the packet to the egress side of the GENEVE device.

The packet routing diagram 1300 continues at step 3 1393 where the kernel encapsulates the packet according to the GENEVE metadata set at step 2 1392. At step 4 1394, the packet is transferred on wire, and at step 5 1395, the kernel decapsulates the packet. The packet routing diagram 1300 continues at step 6 1396 where the packet reaches to (e.g., connects with) the geneve0 device 1306. An eBPF program will be attached to the ingress of the geneve0 device 1306, and the eBPF program will perform the following: (A) Fix the MAC address of the packet. (B) Reverse SNAT from the execution platform IP address to the sandbox IP address. (C) Then the eBPF program will allow the packet to go through the network stack 1307 in the execution platform host namespace, where the packet will be sent to veth1 1308 according to the routing table. At step 7, the packet will be sent back to veth0 1309.

In additional example embodiments, multiple eBPF programs are attached to different places for tracking and monitoring purposes. For example, in one example implementation, at least four eBPF programs are implemented, including veth1 implemented on the execution platform ingress side for outgoing packets, geneve0 on the execution platform ingress side for returned packets, geneve1 on the proxy ingress side for outgoing packets, and eth0 on the proxy ingress side for returning packets.

Figure 14:
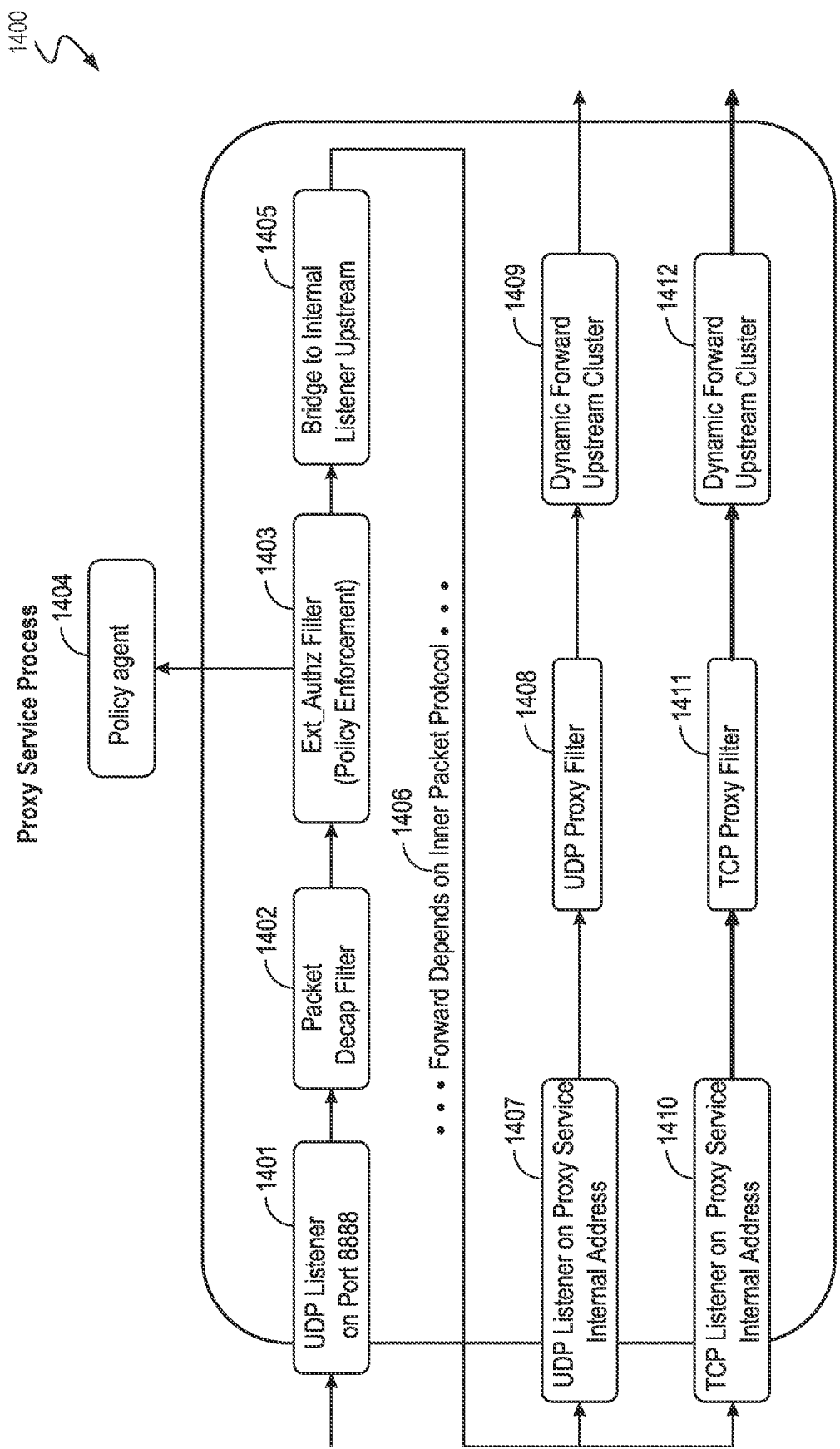
FIG. 14 is a block diagram illustrating an example service proxy process used by the cloud data platform to route and manage network traffic, according to some example embodiments.

FIG. 14 is a block diagram illustrating an example service proxy process 1400 used by the cloud data platform to route and manage network traffic between client applications and cloud data platform services, in accordance with example embodiments. The example embodiment provides UDx external access to enable users to transmit (e.g., send) arbitrary packets of data from a UDx sandbox to the public Internet, including, for example, forwarding packets from the execution platform through an egress proxy host to allow fine-grained access control and traffic visibility.

According to some examples, when a packet lands on a proxy host, there are generally three steps that are performed including: (1) decapsulation of the packet, (2) policy enforcement, and (3) forwarding of the packet to an upstream destination. Each of these three steps can be performed in one of three methodologies, including: (1) by a service proxy process (described in detail in connection with FIG. 14), (2) in the kernel by an eBPF program (described in detail in connection with FIG. 15), and/or (3) a combination of the eBPF program and service proxy process (described in detail in connection with FIG. 16).

According to an example embodiment using the first methodology, a proxy service process provides for strong encryption and authentication mechanisms to secure traffic between customers and cloud data platform services. According to the first methodology of the service proxy process, this example approach indicates that all packets that are encapsulated on the execution platform side will be directly sent to a port that the proxy service process is monitoring (e.g., listening on).

For example, the proxy service process 1400 begins at step 1401 with a User Datagram Protocol (UDP) listener, such as a process or application, waiting for incoming UDP packets on a specific port number (e.g., on Port 8888). As UDP is a connectionless protocol that allows data packets to be sent from one application to another without establishing a connection first. An application using the proxy service process 1400 opens a UDP listener binding it to a specific port number on a host machine and waiting for incoming UDP packets. When the UDP packet arrives at the specific port (e.g., Port 8888), the listener at step 1401 captures the packet and processes it according to rules defined by the application. At step 1402, the proxy service process intercepts and analyzes the captured packet at a decapsulation filter designed to analyze traffic that has been encapsulated or tunneled using a specific protocol and to strip off the encapsulation so the original traffic can be analyzed and processed. For example, the traffic being encapsulated using the GENEVE protocol, a decapsulation filter can intercept the incoming traffic and remove the GENEVE header and options so that the original inner packet can be processed. This decapsulation filter allows security and monitoring tools to inspect the traffic at the application layer, which is typically not possible if the traffic is still encapsulated.

At step 1403, an external authorization filter is made available for a user to configure the network or HTTP(S) filter to call an external service (e.g., via gRPC or HTTP) for authentication and/or authorization purposes. For example, the external authorization filter can include a policy enforcement action designed to evaluate requests for network resources based on external policies or rules (e.g., such as user privileges, group membership, time of day, location, etc.) in order to determine whether the request should be allowed or denied. The policy enforcement filter can be used to restrict access to a sensitive database based on a user's role or privileges assigned to the user from the account administrator. If the filter determines the request should be denied, it transmits the denial to a policy agent at step 1404 and denies the request. If the filter determines the user is authorized to access the resource, the proxy service process continues to step 1405.

At step 1405, a bridge is used to connect an internal listener to an upstream network, where the bridge acts as a networking device to connect two or more segments together. For example, by using a bridge at step 1405, the proxy server process can route traffic from external networks to the internal listener without exposing the listener directly to the external network (e.g., thereby providing additional layer(s) of security).

Depending on the inner packet protocol determined at step 1406, the proxy service process either forwards the packet to a UDP listener at step 1407 or to a TCP listener at step 1410. At step 1407, the UDP listener on an internal address of a proxy server (e.g., a networking device acting as an intermediary between clients and servers). At step 1408, the process continues to a UDP proxy filter, which is a networking component that operates within a UDP proxy server to inspect and/or modify UDP traffic as it passes through the server. The UDP proxy filter examines each UDP packet and determines how to handle the packet based on a predefined set of rules and/or policies (e.g., security and access control policies). At step 1409, the process continues to a dynamic forward upstream cluster (e.g., a cluster of servers) responsible for processing requests and/or providing responses to downstream customers or services.

Returning to step 1406, depending on the inner packet protocol, the proxy service process forwards to a Transmission Control Protocol (TCP) listener on an internal address of a proxy server at step 1410. The TCP listener can be a networking component configured to operate within the server to accept incoming TCP connections from downstream clients. The TCP listener can divide the data to be transmitted into one or more segments and transmits each segment over the network using IP to step 1411.

At step 1411, a TCP proxy filter receives the segments and/or intercepts and analyzes TCP traffic between a client and a server host (e.g., a middleman to modify or filter traffic before forwarding the traffic to the destination). At step 1412, the process continues to a dynamic forward upstream cluster (e.g., a cluster of servers) responsible for processing requests and/or providing responses to downstream customers or services.

Figure 15:
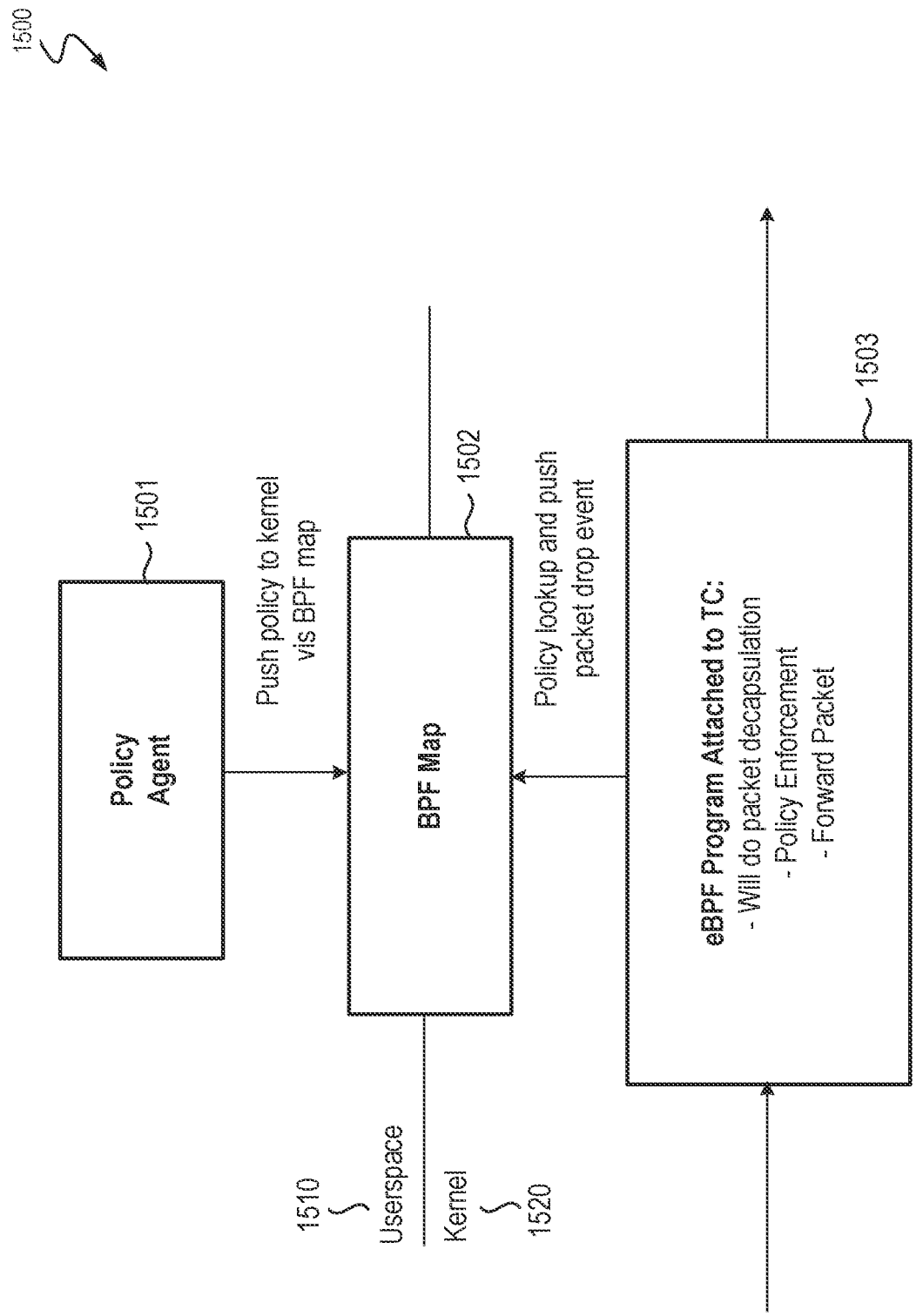
FIG. 15 is a block diagram illustrating an example methodology used by the cloud data platform to route and manage network traffic, according to some example embodiments.

FIG. 15 is a block diagram illustrating an example of a second methodology 1500 used by the cloud data platform to route and manage network traffic between client applications and cloud data platform services, in accordance with example embodiments.

According to an example embodiment using the second methodology, a pure eBPF approach is implemented to provide an approach that indicates that all packet processing will happen inside the eBPF program. At step 1501, the policy agent is configured to push policies into the kernel via an eBPF or BPF map at step 1502, which is a shared memory address between the userspace 1510 and the kernel 1520. When a packet lands on a proxy host, the decapsulation of the packet, policy enforcement, and packet forwarding are all performed inside the eBPF program attached to a traffic control (TC) subsystem of the Linux kernel at step 1503. For example, the TC GENEVE device leverages the traffic control subsystem to perform its encapsulation and decapsulation functions over TCP.

Example embodiments of the second methodology 1500 enable excellent performance as packets will not go through the userspace 1510, and most of the eBPF program can be shared with the execution platform side including pushing the policy into the eBPF program.

Figure 16:
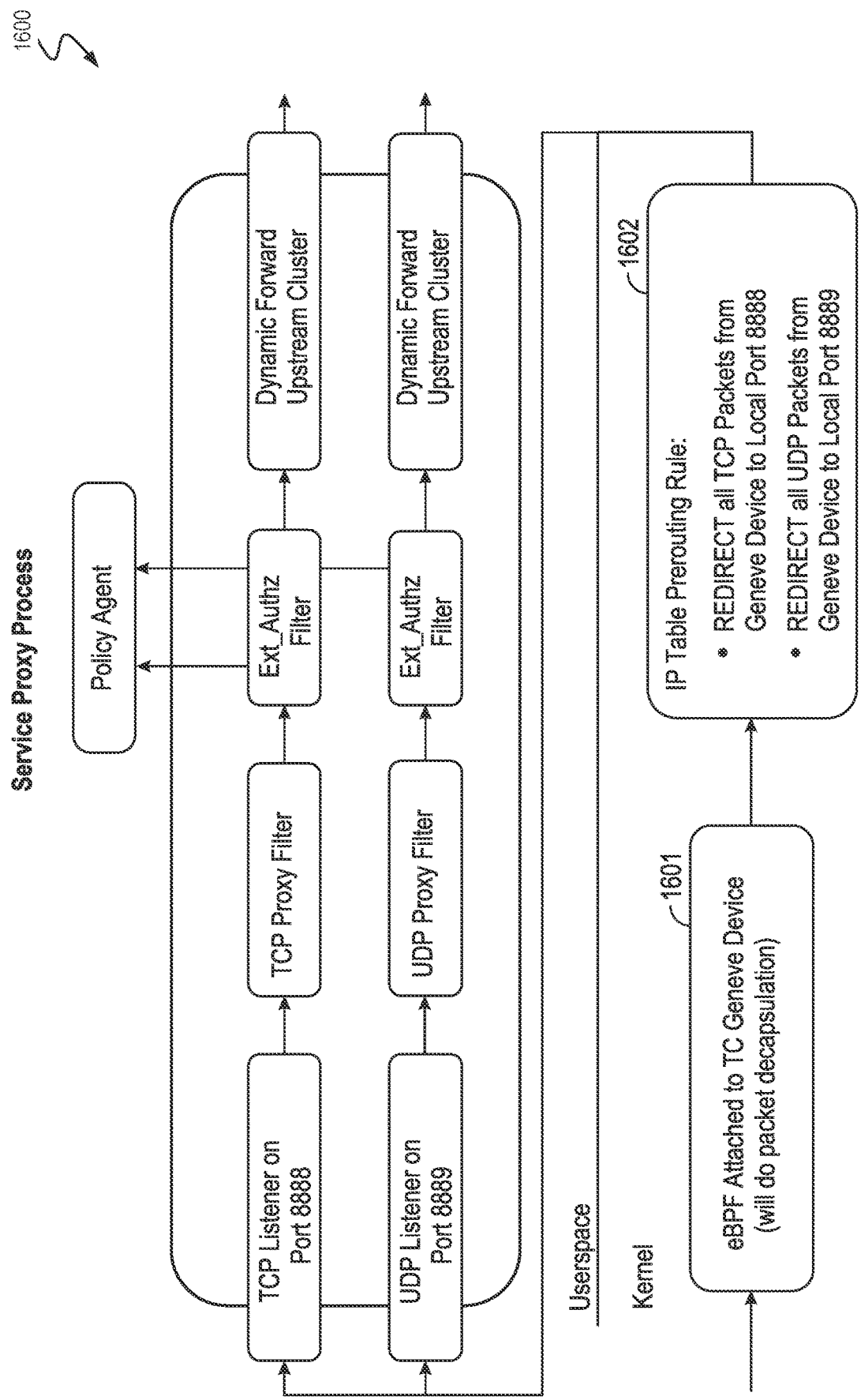
FIG. 16 is a block diagram illustrating an example methodology used by the cloud data platform to manage network traffic, according to some example embodiments.

FIG. 16 is a block diagram illustrating an example of a third methodology 1600 used by the cloud data platform to route and manage network traffic between client applications and cloud data platform services, in accordance with example embodiments.

According to an example embodiment using the third methodology 1600, a combination approach is implemented by combining the service proxy process (e.g., as described in FIG. 14) and the eBPF program process (e.g., as described in FIG. 15). Examples of this approach start at step 1601, which indicates that the packet will be decapsulated inside the eBPF program attached to the TC GENEVE device. At step 1602, the IP Table pre-routing rule will REDIRECT the packet to a local host and port that the service proxy process will be listening on. For example, the pre-routing rule will redirect all TCP packets from the GENEVE device to local port 8888 and redirect all UDP packets from the GENEVE device to local port 8889. The service proxy process will extract the SO_ORIGINAL_DST socket option set by the IP Table. Where the socket option is a parameter to modify the behavior of the endpoints of a bidirectional communication channel between two networked applications. The service proxy process will then forward the packet to the right upstream destination in a similar manner as described in connection with FIG. 14.

Figure 17:
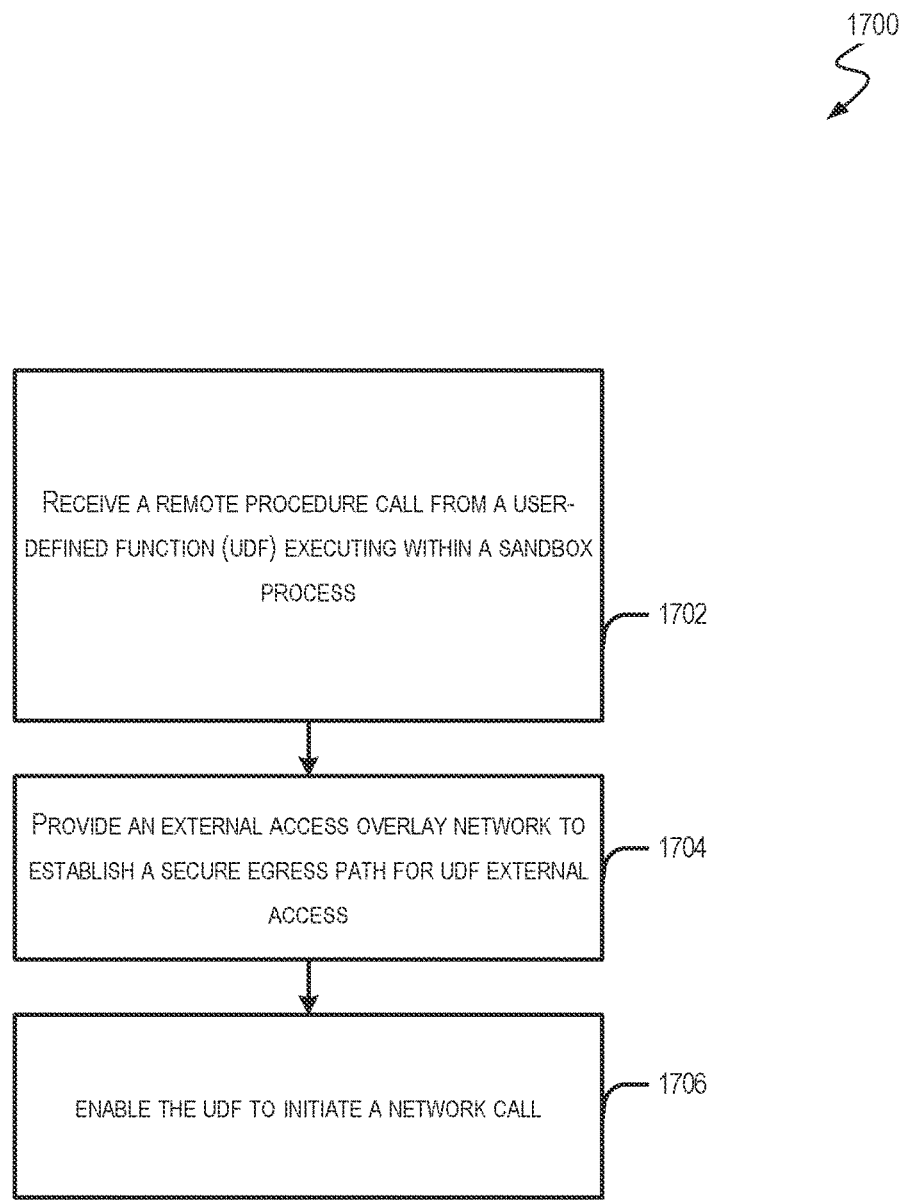
FIG. 17 is a flow diagram illustrating operations of a cloud data platform performing an example method for permitting any sandboxed user-defined function code to access the Internet, according to some example embodiments.

FIG. 17 depicts a flow diagram of a method 1700 for applying a packages policy, according to some example embodiments. The method 1700 can be embodied in machine-readable instructions for execution by one or more hardware components (e.g., one or more processors) such that the operations of the method 1700 can be performed by components of the cloud data platform 102. Accordingly, the method 1700 is described below, by way of example with reference to components of the cloud data platform 102. However, it shall be appreciated that method 1700 can be deployed on various other hardware configurations and is not intended to be limited to deployment within the cloud data platform 102.

Depending on the embodiment, an operation of the method 1700 can be repeated in different ways or involve intervening operations not shown. Though the operations of the method 1700 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

Operation 1702 is for receiving, by the cloud data platform 102, a remote procedure call from a user-defined function (UDF) executing within a sandbox process. Operation 1704 is for providing, by the cloud data platform 102, an external access overlay network to establish a secure egress path for UDF external access. Operation 1706 is for enabling, by the cloud data platform 102, the UDF including the code running in the sandbox process to initiate a network call.

Another general aspect is for a system that includes a memory comprising instructions and one or more computer processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

Described implementations of the subject matter can include one or more features, alone or in combination as illustrated below by way of example.

Example 1 is a method comprising: receiving, by one or more hardware processors, a remote procedure call related to a user-defined function (UDF) executing within a sandbox process, the UDF including code related to at least one operation to be performed; providing an overlay network to establish a secure egress path for UDF external access; and enabling the UDF executing in the sandbox process to initiate a network call based at least in part on the overlay network.

In Example 2, the subject matter of Example 1 optionally includes, wherein establishing the secure egress path for the UDF external access comprises: enabling external access from the sandbox process by identifying virtual ethernet pairs for putting an ethernet device in a namespace of the sandbox process; and performing packet validation to verify a packet.

In Example 3, the subject matter of any one of Examples 1-2 optionally include, deploying, on an egress proxy host, an extended Berkeley Packet Filter (eBPF) to decapsulate the packet, wherein decapsulating the packet includes extracting a policy identifier; receiving, from an execution platform, an egress policy based at least in part on the policy identifier; and reviewing the egress policy to ensure packet destination authorization.

In Example 4, the subject matter of any one of Examples 1-3 optionally include, capturing log data including error events related to the UDF; and enabling revocation of access usage rights in response to the log data.

In Example 5, the subject matter of any one of Examples 1-4 optionally include, in response to the network call, providing direct external access to the UDF executing within the sandbox process via the secure egress path to a public Internet host.

In Example 6, the subject matter of any one of Examples 1-5 optionally include, instantiating the sandbox process as a child process of a platform agent, the platform agent configured to determine whether the UDF is permitted to initiate the network call; and instantiating a user code runtime as a child process of the sandbox process, the sandbox process configured to execute the at least one operation in a sandbox environment.

In Example 7, the subject matter of any one of Examples 1-6 optionally include, instantiating a user code runtime to execute the UDF code, the user code runtime instantiated within the sandbox process of an execution node.

In Example 8, the subject matter of any one of Examples 1-7 optionally include, collecting metric event information associated with the UDF, the metric event information including execution statistics associated with execution of the UDF code by the user code runtime.

In Example 9, the subject matter of any one of Examples 1-8 includes, preventing the code from making a Domain Name System (DNS) request to an unauthorized host, the preventing including specifying where sandboxed functions can connect based on DNS names or wildcard-based DNS patterns.

In Example 10, the subject matter of any one of Examples 1-9 optionally include, instantiating a user code runtime to execute the code of the UDF, the user code runtime including an access control list, the access control list including authorized hosts and access usage rights.

Example 11 is a system comprising: one or more hardware processors of a machine; and at least one memory storing instructions that, when executed by the one or more hardware processors, cause the system to perform operations comprising: receiving, by the one or more hardware processors, a remote procedure call from a user-defined function (UDF) executing within a sandbox process, the UDF including code related to at least one operation to be performed; providing an overlay network to establish a secure egress path for UDF external access; and enabling the UDF executing in the sandbox process to initiate a network call based at least in part on the overlay network.

In Example 12, the subject matter of Example 11 optionally includes, wherein establishing the secure egress path for the UDF external access comprises: enabling external access from the sandbox process by identifying virtual ethernet pairs for putting an ethernet device in a namespace of the sandbox process; and performing packet validation to verify a packet.

In Example 13, the subject matter of any one of Examples 11-12 optionally include, the operations further comprising: deploying, on an egress proxy host, an extended Berkeley Packet Filter (eBPF) to decapsulate the packet, wherein decapsulating the packet includes extracting a policy identifier; receiving, from an execution platform, an egress policy based at least in part on the policy identifier; and reviewing the egress policy to ensure packet destination authorization.

In Example 14, the subject matter of any one of Examples 11-13 optionally include, the operations further comprising: capturing log data including error events related to the UDF; and enabling revocation of access usage rights in response to the log data.

In Example 15, the subject matter of any one of Examples 11-14 optionally include, the operations further comprising: in response to the network call, providing direct external access to the UDF executing within the sandbox process via the secure egress path to a public Internet host.

In Example 16, the subject matter of any one of Examples 11-15 optionally include, the operations further comprising: instantiating the sandbox process as a child process of a platform agent, the platform agent configured to determine whether the UDF is permitted to initiate the network call; and instantiating a user code runtime as a child process of the sandbox process, the sandbox process configured to execute the at least one operation in a sandbox environment.

In Example 17, the subject matter of any one of Examples 11-16 optionally include, the operations further comprising: instantiating a user code runtime to execute the UDF code, the user code runtime instantiated within the sandbox process of an execution node.

In Example 18, the subject matter of any one of Examples 11-17 optionally include, the operations further comprising: collecting metric event information associated with the UDF, the metric event information including execution statistics associated with execution of the UDF code by the user code runtime.

In Example 19, the subject matter of any one of Examples 11-18 optionally include, the operations further comprising: preventing the code from making a Domain Name System (DNS) request to an unauthorized host, the preventing including specifying where sandboxed functions can connect based on DNS names or wildcard-based DNS patterns.

In Example 20, the subject matter of any one of Examples 11-19 optionally include, the operations further comprising: instantiating a user code runtime to execute the code of the UDF, the user code runtime including an access control list, the access control list including authorized hosts and access usage rights.

Example 21 is a machine-storage medium embodying instructions that, when executed by a machine, cause the machine to perform operations comprising: receiving, by one or more hardware processors, a remote procedure call from a user-defined function (UDF) executing within a sandbox process, the UDF including code related to at least one operation to be performed; providing an overlay network to establish a secure egress path for UDF external access; and enabling the UDF executing in the sandbox process to initiate a network call based at least in part on the overlay network.

In Example 22, the subject matter of Example 21 optionally includes, wherein establishing the secure egress path for the UDF external access comprises: enabling external access from the sandbox process by identifying virtual ethernet pairs for putting an ethernet device in a namespace of the sandbox process; and performing packet validation to verify a packet.

In Example 23, the subject matter of any one of Examples 21-22 optionally include, deploying, on an egress proxy host, an extended Berkeley Packet Filter (eBPF) to decapsulate the packet, wherein decapsulating the packet includes extracting a policy identifier; receiving, from an execution platform, an egress policy based at least in part on the policy identifier; and reviewing the egress policy to ensure packet destination authorization.

In Example 24, the subject matter of any one of Examples 21-23 optionally include, capturing log data including error events related to the UDF; and enabling revocation of access usage rights in response to the log data.

In Example 25, the subject matter of any one of Examples 21-24 optionally include, in response to the network call, providing direct external access to the UDF executing within the sandbox process via the secure egress path to a public Internet host.

In Example 26, the subject matter of any one of Examples 21-25 optionally include, instantiating the sandbox process as a child process of a platform agent, the platform agent configured to determine whether the UDF is permitted to initiate the network call; and instantiating a user code runtime as a child process of the sandbox process, the sandbox process configured to execute the at least one operation in a sandbox environment.

In Example 27, the subject matter of any one of Examples 21-26 optionally include, instantiating a user code runtime to execute the UDF code, the user code runtime instantiated within the sandbox process of an execution node.

In Example 28, the subject matter of any one of Examples 21-27 optionally include, collecting metric event information associated with the UDF, the metric event information including execution statistics associated with execution of the UDF code by the user code runtime.

In Example 29, the subject matter of any one of Examples 21-28 optionally include, preventing the code from making a Domain Name System (DNS) request to an unauthorized host, the preventing including specifying where sandboxed functions can connect based on DNS names or wildcard-based DNS patterns.

In Example 30, the subject matter of any one of Examples 21-29 optionally include, instantiating a user code runtime to execute the code of the UDF, the user code runtime including an access control list, the access control list including authorized hosts and access usage rights.

Example 31 is at least one machine-readable medium including instructions that, when executed by processing circuitry, cause the processing circuitry to perform operations to implement of any of Examples 1-30. Example 32 is an apparatus comprising means to implement of any of Examples 1-30.

Figure 18:
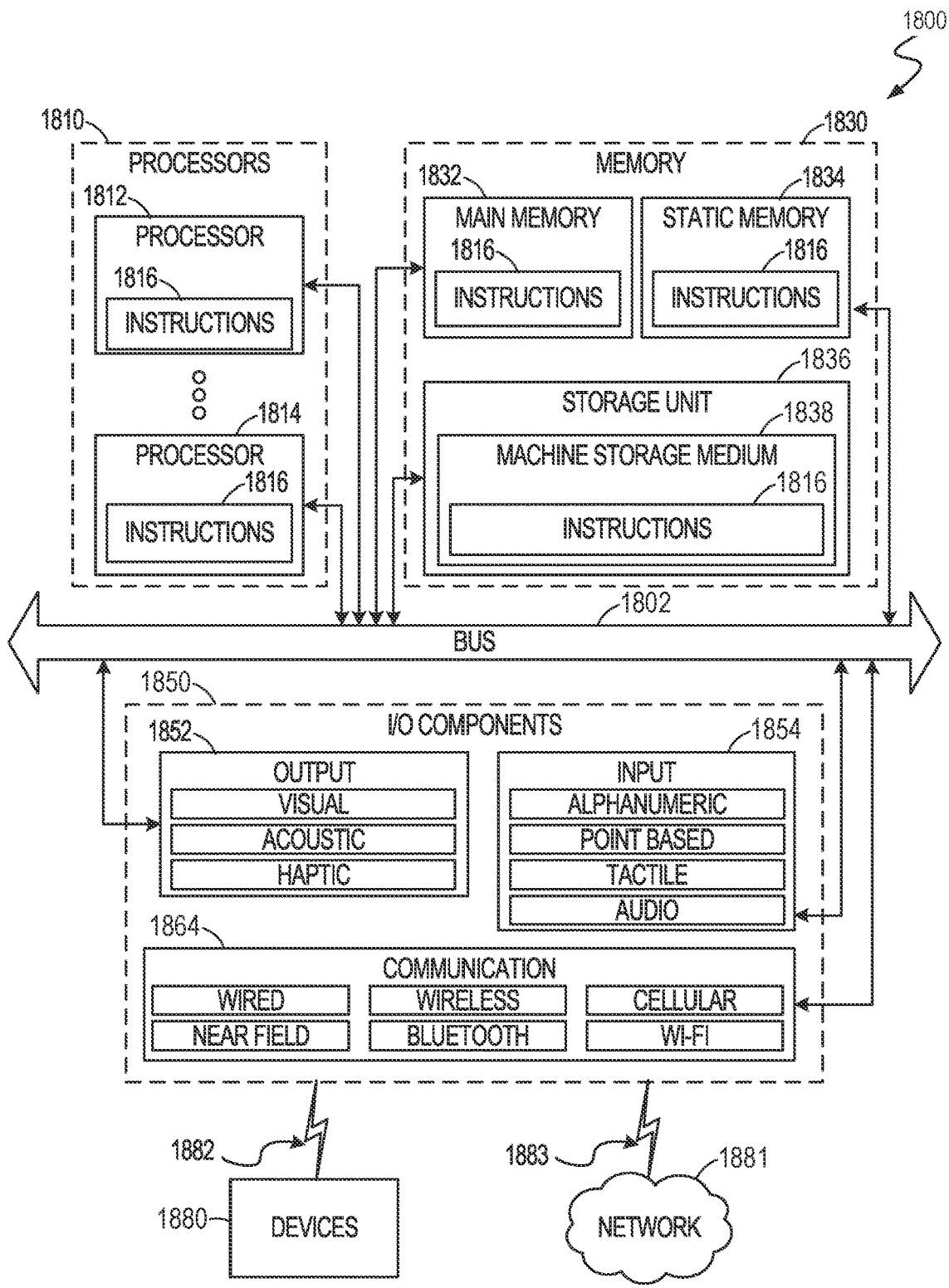
FIG. 18 illustrates a diagrammatic representation of a machine in the form of a computer system within which a set of instructions can be executed for causing the machine to perform any one or more of the methodologies discussed herein, according to some example embodiments.

FIG. 18 illustrates a diagrammatic representation of a machine 1800 in the form of a computer system within which a set of instructions can be executed for causing the machine 1800 to perform any one or more of the methodologies discussed herein, according to an example embodiment. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein can be executed. For example, the instructions 1816 may cause the machine 1800 to execute any one or more operations of any one or more of the methods described herein. As another example, the instructions 1816 may cause the machine 1800 to implement portions of the data flows described herein. In this way, the instructions 1816 transform a general, non-programmed machine into a particular machine 1800 (e.g., the compute service manager 108, the execution platform 110, client device 114) that is specially configured to carry out any one of the described and illustrated functions in the manner described herein.

In alternative embodiments, the machine 1800 operates as a standalone device or can be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 includes processors 1810, memory 1830, and input/output (I/O) components 1850 configured to communicate with each other such as via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1812 and a processor 1814 that may execute the instructions 1816. The term "processor" is intended to include multi-core processors 1810 that may comprise two or more independent processors (sometimes referred to as "cores") that may execute instructions 1816 contemporaneously. Although FIG. 18 shows multiple processors 1810, the machine 1800 may include a single processor with a single core, a single processor with multiple cores (e.g., a multi-core processor), multiple processors with a single core, multiple processors with multiple cores, or any combination thereof.

The memory 1830 may include a main memory 1832, a static memory 1834, and a storage unit 1836, all accessible to the processors 1810 such as via the bus 1802. The main memory 1832, the static memory 1834, and the storage unit 1836 comprising a machine storage medium 1838 may store the instructions 1816 embodying any one or more of the methodologies or functions described herein. The instructions 1816 may also reside, completely or partially, within the main memory 1832, within the static memory 1834, within the storage unit 1836, within at least one of the processors 1810 (e.g., within the processor's cache memory), or any suitable combination thereof, during execution thereof by the machine 1800.

The I/O components 1850 include components to receive input, provide output, produce output, transmit information, exchange information, capture measurements, and so on. The specific I/O components 1850 that are included in a particular machine 1800 will depend on the type of machine.

For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1850 may include communication components 1864 operable to couple the machine 1800 to a network 1881 via a coupling 1883 or to devices 1880 via a coupling 1882. For example, the communication components 1864 may include a network interface component or another suitable device to interface with the network 1881. In further examples, the communication components 1864 may include wired communication components, wireless communication components, cellular communication components, and other communication components to provide communication via other modalities. The devices 1880 can be another machine or any of a wide variety of peripheral devices (e.g., a peripheral device coupled via a universal serial bus (USB)). For example, as noted above, the machine 1800 may correspond to any one of the client devices 114, the compute service manager 108, the execution platform 110, and the devices 1880 may include any other of these systems and devices.

The various memories (e.g., 1830, 1832, 1834, and/or memory of the processor(s) 1810 and/or the storage unit 1836) may store one or more sets of instructions 1816 and data structures (e.g., software) embodying or utilized by any one or more of the methodologies or functions described herein. These instructions 1816, when executed by the processor(s) 1810, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1881 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1881 or a portion of the network 1881 may include a wireless or cellular network, and the coupling 1883 can be a Code Division Multiple Access (CDMA) connection, a Global System for Mobile communications (GSM) connection, or another type of cellular or wireless coupling. In this example, the coupling 1883 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1816 can be transmitted or received over the network 1881 using a transmission medium via a network interface device (e.g., a network interface component included in the communication components 1864) and utilizing any one of a number of well-known transfer protocols (e.g., hypertext transfer protocol (HTTP)). Similarly, the instructions 1816 can be transmitted or received using a transmission medium via the coupling 1882 (e.g., a peer-to-peer coupling) to the devices 1880. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1816 for execution by the machine 1800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals.

The various operations of example methods described herein can be performed, at least partially, by one or more processors that are temporarily configured (e.g., by software) or permanently configured to perform the relevant operations. Similarly, the methods described herein can be at least partially processor implemented. For example, at least some of the operations of the methods described herein can be performed by one or more processors. The performance of certain of the operations can be distributed among the one or more processors, not only residing within a single machine, but also deployed across a number of machines. In some example embodiments, the processor or processors can be located in a single location (e.g., within a home environment, an office environment, or a server farm), while in other embodiments the processors can be distributed across a number of locations.

Although the embodiments of the present disclosure have been described with reference to specific example embodiments, it will be evident that various modifications and changes can be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be used and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   receiving, by one or more hardware processors, a request to execute a user-defined function (UDF) within a sandbox process, the UDF including code related to at least one operation to be performed;
   establishing a secure egress path for the UDF to access an external resource, the secure egress path facilitated by an overlay network configured to isolate network traffic associated with the UDF from other processes;
   enforcing, via the overlay network, egress control based on an egress proxy configured to allow traffic to one or more authorized destinations;
   managing authentication and authorization information for the UDF externally from the sandbox process; and
   maintaining orthogonal functionality with respect to a database system hosting the sandbox process.

2. The method of claim 1, wherein the overlay network is configured to include a User-Defined Function (UDF) external access system architecture that allows direct connection to external resources from sandboxed code.

3. The method of claim 1, wherein the overlay network is configured to enforce the egress control based on the egress proxy.

4. The method of claim 1, further comprising:
   utilizing, via an egress proxy host, a packet filter to decapsulate packets transmitted from the sandbox process.

5. The method of claim 1, wherein the sandbox process is configured to process a database query within a sandbox environment, the sandbox environment including a security mechanism to prevent failure of the database system or exploitation of a vulnerability.

6. The method of claim 5, wherein the UDF is configured to access the database system via the secure egress path.

7. The method of claim 1, wherein the UDF is configured to interact with a remote service via a proxy service, the proxy service configured to relay information to and from the remote service.

8. The method of claim 7, wherein the UDF is configured to use an Application Programming Interface gateway as the proxy service.

9. The method of claim 1, wherein establishing the secure egress path for the UDF to access the external resource comprises:
   identifying a virtual ethernet pair to isolate UDF traffic within the sandbox process; and
   using the virtual ethernet pair to put an ethernet device in a namespace of the sandbox process.

10. The method of claim 1, further comprising:
    preventing the code from making a Domain Name System (DNS) request to an unauthorized host, the preventing including specifying where sandboxed functions can connect based on DNS names or wildcard-based DNS patterns.

11. A system comprising:
    one or more hardware processors of a machine; and
    at least one memory storing instructions that, when executed by the one or more hardware processors, cause the system to perform operations comprising:
        receiving a request to execute a user-defined function (UDF) within a sandbox process, the UDF including code related to at least one operation to be performed;
        establishing a secure egress path for the UDF to access an external resource, the secure egress path facilitated by an overlay network configured to isolate network traffic associated with the UDF from other processes;
        enforcing, via the overlay network, egress control based on an egress proxy configured to allow traffic to one or more authorized destinations;
        managing authentication and authorization information for the UDF externally from the sandbox process; and
        maintaining orthogonal functionality with respect to a database system hosting the sandbox process.

12. The system of claim 11, wherein the overlay network is configured to include a User-Defined Function (UDF) external access system architecture that allows direct connection to external resources from sandboxed code.

13. The system of claim 11, wherein the overlay network is configured to enforce the egress control based on the egress proxy.

14. The system of claim 11, the operations further comprising:
    utilizing, via an egress proxy host, a packet filter to decapsulate packets transmitted from the sandbox process.

15. The system of claim 11, wherein the sandbox process is configured to process a database query within a sandbox environment, the sandbox environment including a security mechanism to prevent failure of the database system or exploitation of a vulnerability.

16. The system of claim 15, wherein the UDF is configured to access the database system via the secure egress path.

17. The system of claim 11, wherein the UDF is configured to interact with a remote service via a proxy service, the proxy service configured to relay information to and from the remote service.

18. The system of claim 17, wherein the UDF is configured to use an Application Programming Interface gateway as the proxy service.

19. The system of claim 11, wherein establishing the secure egress path for the UDF to access the external resource comprises:
    identifying a virtual ethernet pair to isolate UDF traffic within the sandbox process; and
    using the virtual ethernet pair to put an ethernet device in a namespace of the sandbox process.

20. The system of claim 11, the operations further comprising:
    preventing the code from making a Domain Name System (DNS) request to an unauthorized host, the preventing including specifying where sandboxed functions can connect based on DNS names or wildcard-based DNS patterns.

21. A machine-storage medium embodying instructions that, when executed by a machine, cause the machine to perform operations comprising:
    receiving a request to execute a user-defined function (UDF) within a sandbox process, the UDF including code related to at least one operation to be performed;
    establishing a secure egress path for the UDF to access an external resource, the secure egress path facilitated by an overlay network configured to isolate network traffic associated with the UDF from other processes;
    enforcing, via the overlay network, egress control based on an egress proxy configured to allow traffic to one or more authorized destinations;
    managing authentication and authorization information for the UDF externally from the sandbox process; and
    maintaining orthogonal functionality with respect to a database system hosting the sandbox process.

22. The machine-storage medium of claim 21, wherein the overlay network is configured to include a User-Defined Function (UDF) external access system architecture that allows direct connection to external resources from sandboxed code.

23. The machine-storage medium of claim 21, wherein the overlay network is configured to enforce the egress control based on the egress proxy.

24. The machine-storage medium of claim 21, the operations further comprising:
    utilizing, via an egress proxy host, a packet filter to decapsulate packets transmitted from the sandbox process.

25. The machine-storage medium of claim 21, wherein the sandbox process is configured to process a database query within a sandbox environment, the sandbox environment including a security mechanism to prevent failure of the database system or exploitation of a vulnerability.

26. The machine-storage medium of claim 25, wherein the UDF is configured to access the database system via the secure egress path.

27. The machine-storage medium of claim 21, wherein the UDF is configured to interact with a remote service via a proxy service, the proxy service configured to relay information to and from the remote service.

28. The machine-storage medium of claim 27, wherein the UDF is configured to use an Application Programming Interface gateway as the proxy service.

29. The machine-storage medium of claim 21, wherein establishing the secure egress path for the UDF to access the external resource comprises:
    identifying a virtual ethernet pair to isolate UDF traffic within the sandbox process; and using the virtual ethernet pair to put an ethernet device in a namespace of the sandbox process.

30. The machine-storage medium of claim 21, the operations further comprising:
preventing the code from making a Domain Name System (DNS) request to an unauthorized host, the preventing including specifying where sandboxed functions can connect based on DNS names or wildcard-based DNS patterns.

\* \* \* \* \*